United States Patent [19]
Trout

[11] Patent Number: 5,609,262
[45] Date of Patent: Mar. 11, 1997

[54] TAMPER EVIDENT, CHILD-RESISTANT CLOSURE

[75] Inventor: Stanley D. Trout, Huntington, Ind.

[73] Assignee: Rieke Corporation, Auburn, Ind.

[21] Appl. No.: 532,157

[22] Filed: Sep. 22, 1995

[51] Int. Cl.$^6$ ................................................ B65D 55/02
[52] U.S. Cl. ............................................ 215/219; 215/252
[58] Field of Search .................................... 215/206, 214, 215/217, 218, 219, 221, 252

[56] References Cited

U.S. PATENT DOCUMENTS

| | | |
|---|---|---|
| 3,878,961 | 4/1975 | Curry et al. .............................. 215/219 |
| 3,888,375 | 6/1975 | Gerk ....................................... 215/219 |
| 3,944,102 | 3/1976 | Grau ....................................... 215/251 |
| 4,364,484 | 12/1982 | Kinsley . |
| 4,433,789 | 2/1984 | Gibilisco . |
| 4,527,701 | 7/1985 | Schaubeck . |
| 4,546,892 | 10/1985 | Couput . |
| 4,598,833 | 7/1986 | Herr . |
| 4,653,657 | 3/1987 | Papavasilopoulos . |
| 4,721,218 | 1/1988 | Gregory et al. . |
| 4,801,030 | 1/1989 | Barriac . |
| 4,801,031 | 1/1989 | Barriac . |
| 4,884,706 | 12/1989 | Julian . |
| 4,913,300 | 4/1990 | Wiedmer et al. . |
| 4,938,370 | 7/1990 | McBride . |
| 4,971,212 | 11/1990 | Kusz . |
| 4,978,016 | 12/1990 | Hayes . |
| 4,978,017 | 12/1990 | McBride . |
| 4,981,230 | 1/1991 | Marshall et al. . |
| 4,997,097 | 3/1991 | Krautkrämer . |
| 5,004,112 | 4/1991 | McBride . |
| 5,005,718 | 4/1991 | Buono . |
| 5,007,545 | 4/1991 | Imberry, Jr. . |
| 5,080,246 | 1/1992 | Hayes . |
| 5,090,788 | 2/1992 | Ingram et al. . |
| 5,096,079 | 3/1992 | Odet ....................................... 215/252 |
| 5,107,998 | 4/1992 | Zumbuhl . |
| 5,115,929 | 5/1992 | Buono . |
| 5,129,530 | 7/1992 | Fuchs . |
| 5,145,078 | 9/1992 | Hannon et al. . |
| 5,197,616 | 3/1993 | Buono . |
| 5,197,620 | 3/1993 | Gregory . |
| 5,252,068 | 9/1993 | McCandless . |
| 5,271,512 | 12/1993 | Ekkert . |
| 5,280,681 | 1/1994 | Kusz . |
| 5,280,842 | 1/1994 | Koo . |
| 5,295,600 | 3/1994 | Kowal . |
| 5,310,069 | 5/1994 | Ingram et al. . |
| 5,370,251 | 12/1994 | Buono . |
| 5,397,009 | 3/1995 | Salmon et al. . |
| 5,400,913 | 3/1995 | Kelly . |
| 5,445,283 | 8/1995 | Krautkramer .......................... 215/218 |
| 5,450,973 | 9/1995 | Ellis et al. ............................. 215/252 |

FOREIGN PATENT DOCUMENTS

| | | | |
|---|---|---|---|
| 2254688 | 5/1974 | Germany .............................. 215/219 |
| 3025911 | 1/1982 | Germany .............................. 215/219 |
| 1441341 | 6/1976 | United Kingdom .................. 215/219 |

*Primary Examiner*—Stephen Cronin
*Attorney, Agent, or Firm*—Woodard, Emhardt, Naughton, Moriarty & McNett

[57] ABSTRACT

A child-resistant, tamper-evident closure for sealing an open-topped container having an external thread formed on a neck finish includes a combination of inner and outer caps where the inner cap includes a tamper-evident band which is connected to the remainder of the inner cap by a series of frangible elements. The inner cap further includes a series of folded ratchet-like tabs which are in a locked position behind an annular bead. The tabs are arranged so as to engage an annular lip on the neck finish. The outer cap snaps over the inner cap and includes a series of ratchet teeth which are directed toward the inner cap. The top surface of the inner cap includes a series of depressions which are sized and arranged for engagement with the series of ratchet teeth. The child-resistant arrangement permits the outer cap to turn relative to the inner cap in a counterclockwise direction. In the clockwise direction, the ratchet teeth and depressions are in engagement such that turning of the outer cap will advance the inner cap into threaded engagement. Removal of the inner cap from the neck finish is achieved by ovalizing the outer cap so as to bring into engagement ribs on the inner cap with ribs on the inside surface of the sidewall of the outer cap. By means of rib engagement and frictional interference, the outer cap is used to remove the inner cap.

12 Claims, 28 Drawing Sheets

TAMPER EVIDENT, CHILD-RESISTANT CLOSURE

BACKGROUND OF THE INVENTION

The present invention relates in general to the design of a threaded plastic closure which is used to close off the outlet opening of an open-topped container. More specifically the present invention relates to the design of a threaded closure which is constructed so as to provide a tamper-evident arrangement as well as being made child-resistant. The tamper-evident closure of the present invention is disclosed in two primary embodiments, one with the child-resistant arrangement and one without the child-resistant arrangement. However, it would be possible with the mold design which is used for the present invention to construct the inner cap without the tamper-evident feature and thereby effectively create four different configurations from the same basic mold design.

The child-resistant arrangement is achieved by the use of an outer cap which is concentrically configured relative to an inner cap and is snapped over the inner cap so as to be retained in its desired relationship with the inner cap. The elimination of the outer cap removes the intended child-resistant capability.

Plastic, tamper-evident threaded closures have been available for a number of years and are thus regarded as being well-known to a person of ordinary skill in the art. These closures employ a variety of features for various reasons and applications. The tamper-evident arrangements likewise represent a variety of design approaches, though there are quite often certain similarities. The underlying objective is to enable the user of the product to determine whether the initially filled and closed container has been improperly opened which could indicate a tampering attempt. Tamper-evident closures have commonly been made of aluminum or plastic, with one type of closure including an upper cap portion and a lower security ring or band attached to the cap portion by a failure line. When the two-piece cap is removed, the closure breaks along the failure line, leaving the ring separate from the cap portion.

While this art is quite crowded, the following listed patent references are believed to provide a representative sampling of earlier tamper-evident closures which relate generally to the present invention:

| PATENT NO. | PATENTEE | ISSUE DATE |
| --- | --- | --- |
| 4,546,892 | Couput | Oct. 15, 1985 |
| 4,721,218 | Gregory et al. | Jan. 26, 1988 |
| 4,801,030 | Barriac | Jan. 31, 1989 |
| 4,801,031 | Barriac | Jan. 31, 1989 |
| 4,913,300 | Wiedmer et al. | Apr. 3, 1990 |
| 4,971,212 | Kusz | Nov. 20, 1990 |
| 4,978,016 | Hayes | Dec. 18, 1990 |
| 4,978,017 | McBride | Dec. 18, 1990 |
| 5,090,788 | Ingram et al. | Feb. 25, 1992 |
| 5,107,998 | Zumbuhl | Apr. 28, 1992 |
| 5,129,530 | Fuchs | Jul. 14, 1992 |
| 5,295,600 | Kowal | Mar. 22, 1994 |
| 5,310,069 | Ingram et al. | May 10, 1994 |
| 5,397,009 | Salmon et al. | Mar. 14, 1995 |
| 5,400,913 | Kelly | Mar. 28, 1995 |
| 4,884,706 | Julian | Dec. 5, 1989 |
| 5,080,246 | Hayes | Jan. 14, 1992 |
| 5,145,078 | Hannon et al. | Sep. 8, 1992 |
| 5,197,620 | Gregory | Mar. 30, 1993 |
| 5,271,512 | Ekkert | Dec. 21, 1993 |
| 4,653,657 | Papavasilopoulos | Mar. 31, 1987 |
| 4,938,370 | McBride | Jul. 3, 1990 |
| 4,981,230 | Marshall et al. | Jan. 1, 1991 |
| 5,004,112 | McBride | Apr. 2, 1991 |
| 5,252,068 | McCandless | Sep. 7, 1993 |

While the foregoing references should adequately summarize the state of the art, there are other aspects of the present invention which deserve additional consideration relative to any earlier references which may be relevant. One feature of the present invention is the addition of an outer cap so as to convert the basic closure, whether tamper-evident or not, into a child-resistant closure. A unique arrangement of ratchet teeth in the outer circumferential periphery of the outer cap in combination with circumferential depressions in the upper surface of the inner cap provide the means of advancing the inner cap onto the threaded outlet opening through ratchet and depression engagement. Retrograde removal of the inner cap, which would be achieved in the normal manner of counterclockwise rotation of the outer cap, is accomplished by other means which do not involve ratchet tooth engagement. Removal of the inner cap according to the present invention requires ovalizing of the outer cap so as to draw portions of the outer cap into engagement with the inner cap, at which point axial ribs are drawn into abutment in order to transfer rotational torque from the outer cap to the inner cap.

The user of inner and outer caps in order to provide what is referred to as a type of child-resistant closure is disclosed in U.S. Pat. No. 4,598,833, issued Jul. 8, 1986 to Herr, and by U.S. Pat. No. 5,280,842, issued Jan. 25, 1994 to Koo. The Herr patent discloses a child-resistant, tamper-evident closure having nested inner and outer caps with ratchet teeth on the inner facing skirt walls of the respective caps to cooperate to fasten the closure onto the container, and ratchet teeth on the inner facing top walls of the respective caps for removal of the closure upon simultaneous application of torque and a downward force. The Koo patent discloses a two-piece child-resistant closure which utilizes a ratchet feature to screw on the closure. One feature of this design is a particular ratchet configuration which includes a specific placement of the elements thereof in order to provide negligible reverse torque during undepressed counterclockwise rotation of the outer closure member. In this application, negligible reverse torque is defined as the torque caused by frictional contact of the outer and inner cap members when the undepressed closure is turned in the removal direction and this is insufficient to cause the undesired or accidental removal of the closure from the container.

The top wall of each cap in these two listed references is a solid circular panel as contrasted with an annular ring-shaped top wall which is consistent with the present invention. Further, the ratchet teeth on each cap are arranged in a radiating pattern across the corresponding surface of the top wall. In order to accommodate such a ratchet tooth pattern, the top wall of each cap needs to be of a solid circular shape rather than being of an annular-ring shape. The presence of a solid top wall for each cap results in the use of more material, increased closure weight, and makes the desired ovalizing of the cap a significantly more difficult manipulation. With a solid circular top wall the wall material must deform in some direction if the outer cap is to be radially compressed into an oval shape. This requires more force than what is required with a substantially open top wall.

However, since the retrograde removal of the corresponding inner caps of these two references involves ratchet tooth engagement and in one instance simultaneous downward force, ovalizing of the outer cap is not a consideration. Since the Koo closure receives a downward axial force which must be exerted on the top surface of the outer cap in order to remove the inner cap, this would provide another reason for requiring a solid top wall as part of the outer cap.

In contrast, the present invention uses a unique outer cap design with only a partial top wall having an annular-ring shape. The annular ring shape of the top wall portion of the present invention thereby defines and leaves open the center area. The ratchet teeth which are present on the outer cap are disposed on the underside of the partial top wall portion and extend in the direction of the inner cap. The pattern of ratchet teeth on the outer cap is circumferential rather than radial and this permits the center portion of the outer cap to be left open, thereby reducing the weight and the amount of material. The open center portion of the outer cap also simplifies to some extent ovalizing of the outer cap which is the required manipulation in order to be able to remove the inner cap.

Turning now to caps and closures which incorporate some type of tamper-evident feature, a break-away ring is often employed. For the most part these closure designs use inwardly and upwardly extending tabs such as disclosed in the Herr '833 patent. This style of tabs requires some type of post-forming operation after the cap is initially molded in order to orient the tabs in the desired inward and upward direction. As perceived by Herr, "conventional molding processes are not capable of producing a closure having the preferred tabs extending upwardly and inwardly as described above" (Herr '833 patent, column 5, lines 27–29). Consequently, in a separate operation, the tabs are bent radially inwardly and upwardly, with heat being applied to the tab joints.

It is obviously important to get the tabs oriented in the desired manner as efficiently and as cost effectively as possible. Notwithstanding the descriptions in the Herr '833 patent, U.S. Pat. No. 5,007,545, issued Apr. 16, 1991 to Imbery, Jr., describes a molding method which does not require side action mold parts nor any subsequent forming operations. The sequential molding steps are illustrated in FIGS. 9–13 of the Imbery, Jr. patent.

U.S. Pat. No. 4,997,097, issued Mar. 5, 1991, to Krautkrämer discloses a closure with inwardly and upwardly directed tabs. However, there is no specific mention of the molding process, nor whether a post-forming operation is required to achieve this particular tab orientation. The Krautkrämer patent discloses a design which is otherwise believed to be conventional as to the general style and function of the tabs.

The present invention provides a unique manufacturing method and a unique resulting configuration for a series of upwardly directed tabs. As the inner cap is molded, a circumferential series of tabs are initially formed in a downwardly-extending orientation. However, as the molding process is concluded and the cap is ejected from the mold, the tabs are bent upwardly and tucked inside an annular bead which is integrally formed as part of the sidewall of the inner cap. The annular bead which is actually an offset wall portion holds the bent tabs in this desired configuration, thereby presenting the tabs in an operable orientation so as to provide a tamper-evident feature to the present invention. The tabs are also placed in engagement with axial ribs disposed around the neck finish of the corresponding container on which the cap is used to provide an anti-backoff feature.

Whether the present invention is configured as a child-resistant closure, as a tamper-evident closure, or as a combination of the two, each of these various configurations includes unique structural features and characteristics which are not found in any of the listed patent references.

SUMMARY OF THE INVENTION

A child-resistant closure for sealing an open-topped container having an external screw thread formed on a neck finish of the container according to one embodiment of the present invention comprises an outer cap having an annular ring top wall portion which defines an open center portion, the outer cap having a surrounding sidewall, and an inner cap having an upper wall and an internally-threaded, surrounding sidewall for engagement with the external screw thread on the neck finish of the container, the outer cap overlying the inner cap and being substantially concentric therewith, an annular ring pattern of ratchet teeth in unitary construction with the annular ring top wall portion and oriented toward the upper wall of the inner cap, the upper wall having formed therein an annular ring pattern of receiving depressions and the ratchet teeth engaging the receiving depressions when the outer cap is turned in a clockwise advancing direction so as to rotate the inner and outer caps together and thereby cause the advancing threaded engagement of the inner cap onto the neck finish, the ratchet teeth sliding over the receiving depressions when the outer cap is turned in a clockwise removal direction, at least one series of axial ribs in unitary construction with the sidewall of the outer cap and oriented toward the sidewall of the inner cap and a plurality of axial ribs in unitary construction with the sidewall of the inner cap and oriented toward the sidewall of the outer cap, whereby ovalizing of the outer cap by oppositely and inwardly directed compressive forces brings a plurality of the axial ribs of the outer cap into the proximity of the axial ribs of the inner cap whereby turning of the outer cap in a counterclockwise removal direction results in axial rib engagement to assist in hike removal of the inner cap from the neck finish.

A tamper-evident closure for sealing an open-topped container having an external screw thread formed on a neck finish of the container according to another embodiment of the present invention comprises a closure cap having an upper wall and an internally-threaded, surrounding sidewall, the sidewall extending downwardly from the upper wall to a lower edge portion, the closure cap further including in unitary construction with the sidewall and with the lower edge portion an annular bead which is downwardly extending below the lower edge portion, and tamper-indicating means comprising a break-away annular ring depending from the lower edge portion of the sidewall, a plurality of frangible elements detachably securing the annular ring to the lower edge portion and a plurality of ratchet tabs bent upwardly, the frangible elements being radially spaced outwardly from the annular bead and defining therewith an annular channel, a portion of the ratchet tabs being positioned within the annular channel whereby the annular bead is used to hold the ratchet tabs in their folded position.

One object of the present invention is to provide an improved child-resistant closure.

Another object of the present invention is to provide an improved tamper-evident closure.

A further object of the present invention is to provide an improved child-resistant, tamper-evident closure.

Related objects and advantages of the present invention will be apparent from the following description.

DESCRIPTION OF THE PREFERRED EMBODIMENT

Figure 1:
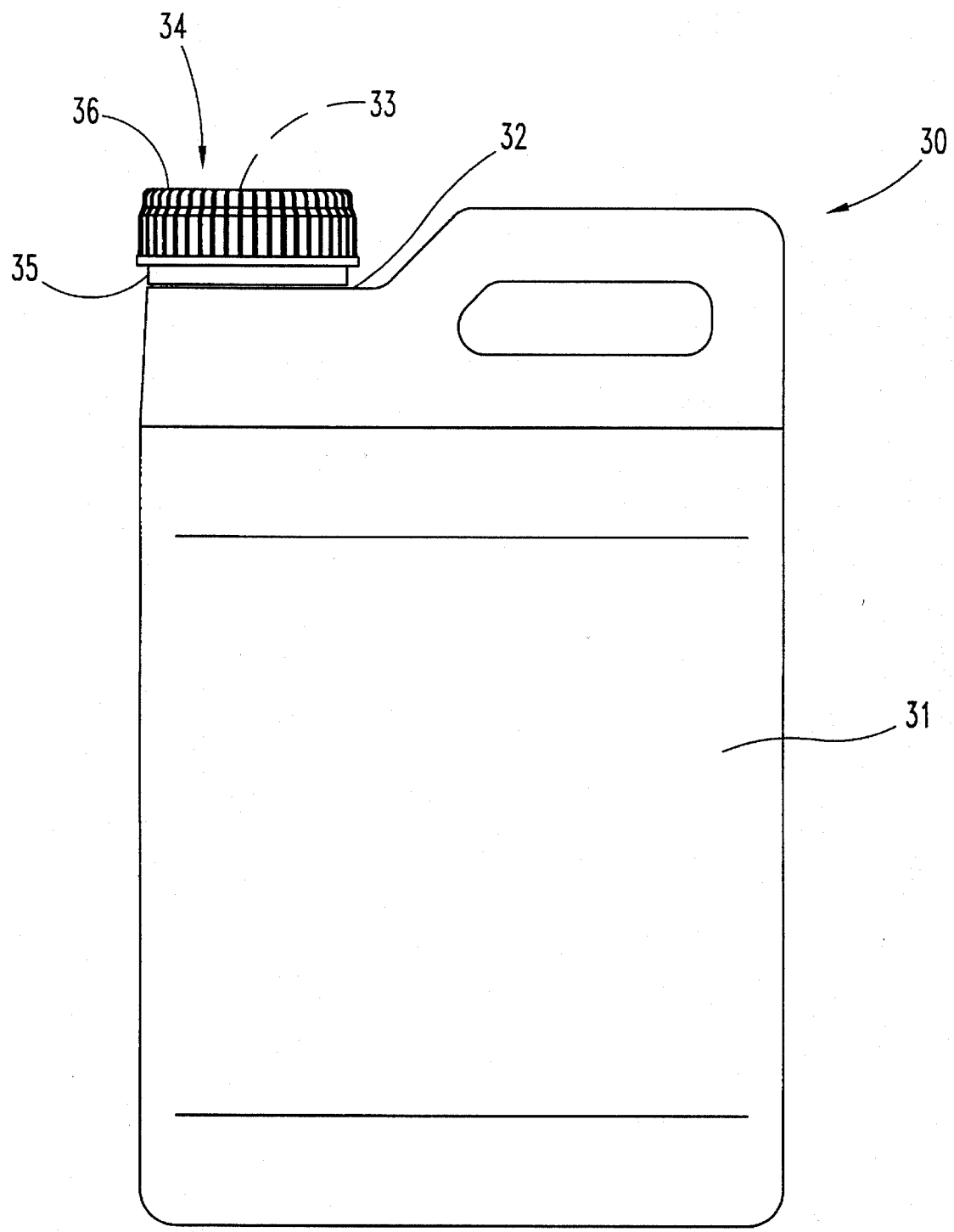
FIG. 1 is a perspective view of a child-resistant, tamper-evident closure as applied to the outlet opening of a container according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a closed container and cap assembly combination 30 according to the present invention. Combination 30 includes a blow-molded plastic container 31 with an externally-threaded and raised neck finish 32. Neck finish 32 provides the outlet opening 33 through which the contents of container 31 pass. In the FIG. 1 illustration, the outlet opening 33 is sealed closed by cap assembly 34. Cap assembly 34 includes an inner cap 35 which provides a tamper-evident capability to the combination and an outer cap 36 which provides a child-resistant feature to the combination. While the child-resistant feature is the result of adding outer cap 36, it should be understood that portions of inner cap 35 are required to cooperate with outer cap 36 in order to achieve the child-resistant capability.

Figure 2:
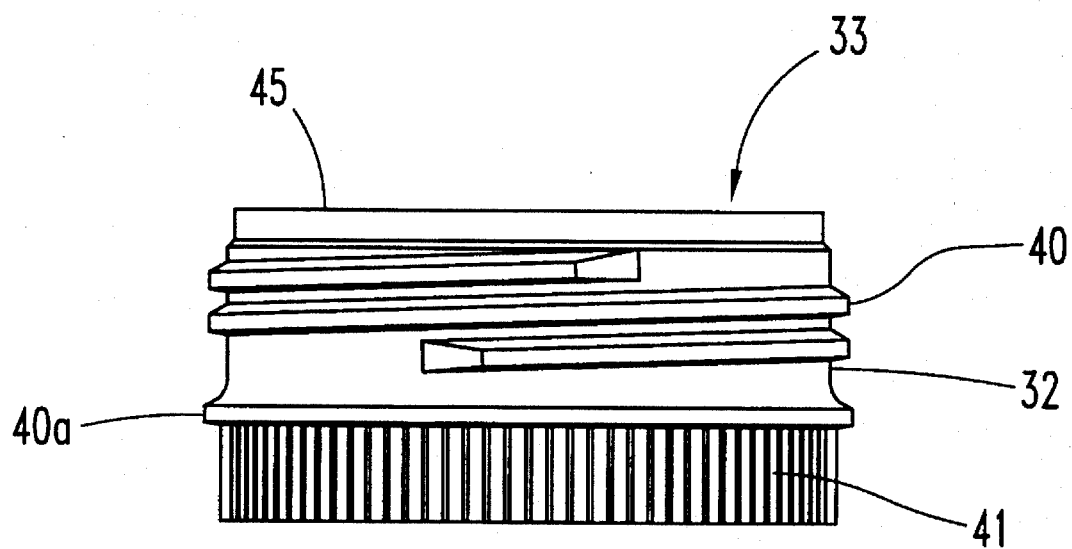
FIG. 2 is a front elevational view of the neck finish of the FIG. 1 container with the closure removed.

The neck finish 32 of container 31 which is illustrated in detail in FIG. 2 includes a series of external threads 40 and a plurality of axial ribs 41 which extend around the outer circumference of the neck finish 32 below the external threads 40. The neck finish 32 is substantially cylindrical and of unitary construction with the remainder of the blow-mold container. Disposed between threads 40 and axial ribs 41 is a retaining lip 40a which serves to retain the tamper-evident ring on the container neck finish once this ring breaks free from the remainder of the inner cap 35. Lip 40a also provides the abutment surface which prevents axial movement of the tamper-evident ring as the inner cap is unscrewed. As a result of this abutment the tamper-evident ring is severed from the remainder of the inner cap 35.

Figure 3:
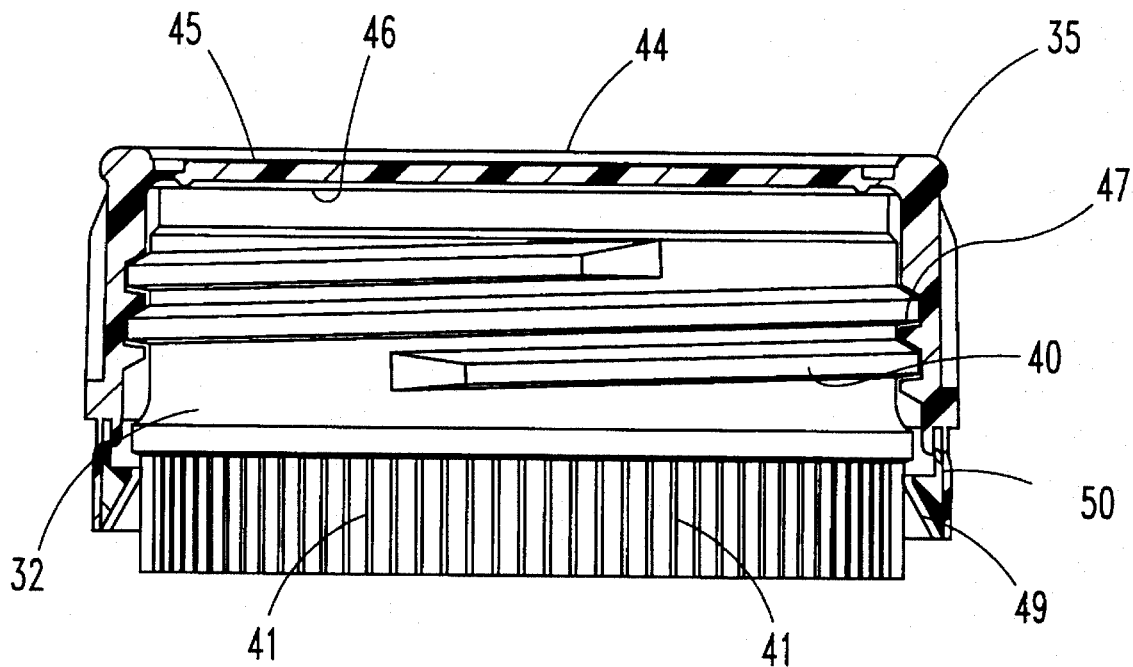
FIG. 3 is a front elevational view of the FIG. 2 neck finish with a tamper-evident inner cap applied, the cap being illustrated as a full cross-sectional view.

Referring to FIG. 3 the inner cap 35 is illustrated as threadedly assembled onto the neck finish 32. The internally threaded inner cap 35 engages the externally-threaded neck finish in the conventional manner with the upper wall 44 of the inner cap 35 sealing against the upper edge 45 of outlet opening 33. An optional liner 46 is illustrated as being positioned against the inner surface of the upper or top end wall 44. The liner 46 seals against the upper edge 45 with the requisite sealing force being provided by the threaded engagement and manual tightening of internal threads 47 of the inner cap 35 onto the neck finish 32. As would be understood for the normal or conventional threaded engagement, inner cap 35 advances onto neck finish 32 with clockwise rotation and is able to be removed from the neck finish with counterclockwise rotation.

As will be described in greater detail hereinafter, a circumferential series of ratchet-like tabs 49 are provided as part of inner cap 35. These tabs are part of a break-away ring 50 which provides the tamper-evident capability to the present invention. The tabs 49 (see FIG. 7) are styled in a way so as to provide two separate capabilities to the present invention. The tabs are illustrated in their folded orientation in FIG. 8. Each tab 49 has a wedge-like shape in the axial direction and the wedge-like shape is oriented with a radially-thinner section 49a positioned at the lower edge of the break-away ring 50 where the tabs 49 are hinged and extend upwardly therefrom to a radially-thicker section 49b. A substantially horizontal surface 49c provides the abutment surface against the under side of annular lip 40a. As should be understood, the folded tabs 49 are able to radially deflect in an outward direction so as to pass over lip 40a with advancing threaded engagement of inner cap 35 onto neck finish 32. However, any attempt to remove inner cap 35 causes surface 49c of each tab 49 to be drawn upwardly into contact with lip 40a. This abutment ultimately results in separation of the break-away ring 50 from the remainder of the inner cap. The lip 40a then serves to retain the ring 50 on the neck finish.

Each tab 49 also includes a ratchet-like projection 49d (see FIG. 9) which has a triangular shape, an inclined surface 49e and a lip extension 49f. The projections 49d engage axial ribs 41 in a ratchet-like manner such that the inner cap can be advanced onto the neck finish with the tabs riding over the axial ribs 41. Once the inner cap is fully engaged on the neck finish, the projections interlock with the axial ribs 41 in order to prevent any back off of the inner cap from the neck finish due to vibrations and movements which can occur during shipping and handling. While the interlock may also contribute to some extent to the tamper-evident capability, that is not the primary function of the projection 49d and rib 41 interlock.

Increasing the force level of the retrograde rotation in a counterclockwise direction will ultimately cause the tamper-evident, break-away ring 50 to sever from the remainder of the inner cap 35 by the fracture of connecting frangible elements 51. Once the frangible elements 51 break free, lip 40a helps to keep the ring 50 retained on the neck finish so that this loose ring cannot fall or dislodge into an unacceptable location such as into the receptacle where the contents of container 31 are being poured. By means of the break-away ring 50, there is a visual indication provided to the end user as to whether a newly filled and closed container has been opened after a new tamper-evident inner cap is applied. Any attempt to tamper with the container and its contents will be evidenced by breakage of the frangible elements 51. If the break-away ring 50 is severed from the remainder of the inner cap 35, the end user is immediately alerted and can proceed accordingly to either test the contents of the container for contamination or simply not use the contents and select instead an unopened container.

Figure 10:
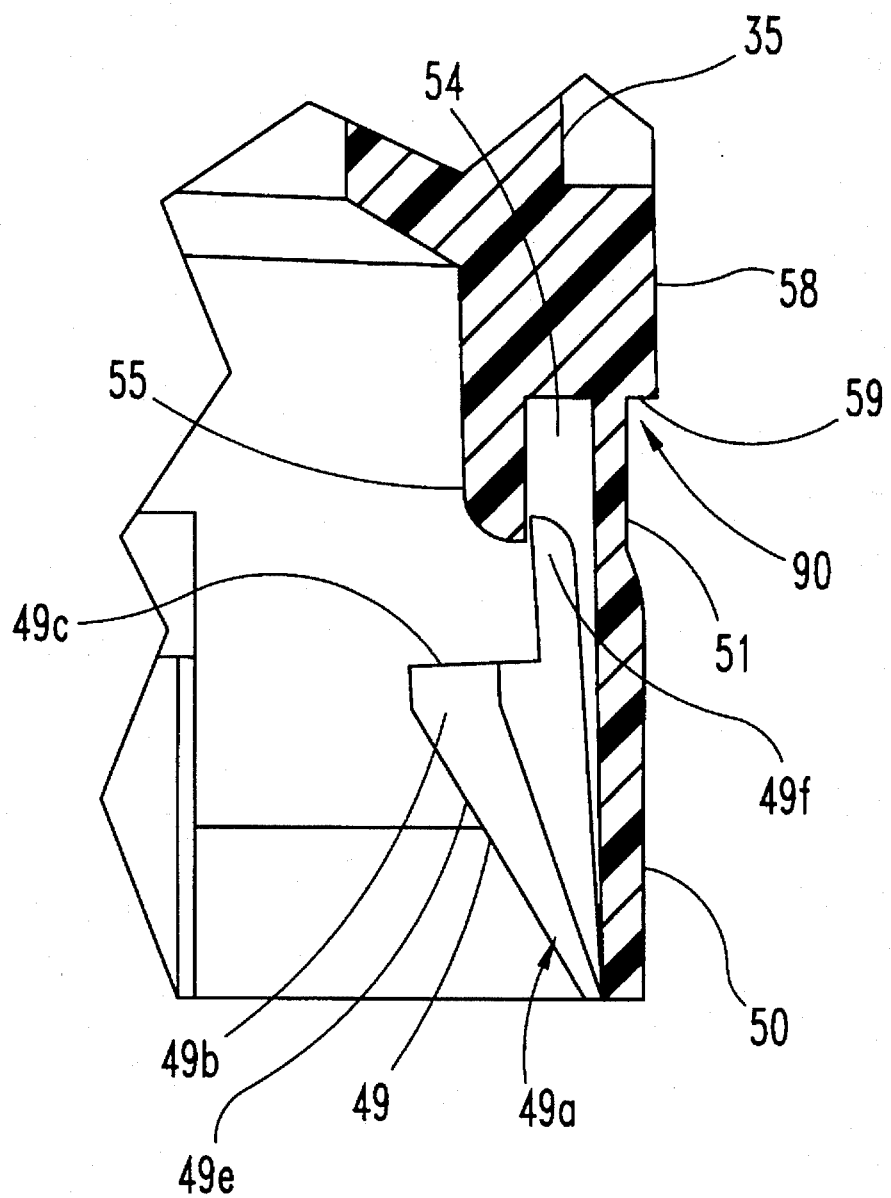
FIG. 10 is an enlarged, partial section view of the FIG. 8 inner cap according to the present invention.

Referring now to FIGS. 4–7, the inner cap 35 is illustrated as it appears in an initially molded configuration with the ratchet-like tabs 49 in a downwardly extending orientation. This is the orientation which results from the mold arrangement in the initial stages of the process. In the later stages of the molding process, the tabs are bent upwardly and tucked into a locked position within an annular channel 54 and behind an annular bead 55, as illustrated in FIG. 10. Lip extension 49f provides the means of achieving a locked position behind annular bead 55.

Figure 4:
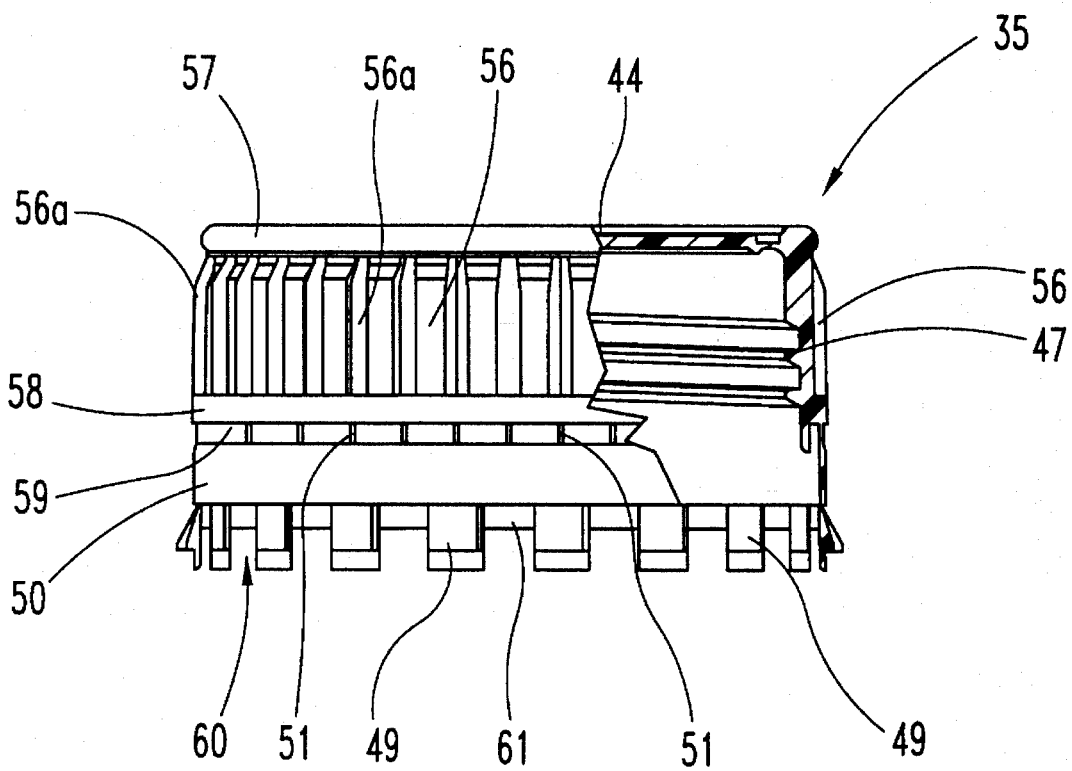
FIG. 4 is a front elevational view in partial section of the FIG. 3 inner cap comprising a portion of the FIG. 1 closure according to the present invention with its interlocking tabs in a downward direction.

Referring specifically to FIG. 4, inner cap 35 includes a substantially cylindrical outer sidewall 56 including a circumferential series of evenly-spaced, raised axial ribs 56a which extend between top rim 57 and lower edge 58. Sidewall 56 is internally threaded for threaded engagement with the external threads 40 disposed on the neck finish 32. The underside 59 of lower edge 58 is initially connected to break-away ring 50 by the frangible elements 51. The ratchet-like tabs 49 extend downwardly from the lower edge of ring 50 and are interconnected to each other by a connecting membrane 60 which extends between adjacent tabs as individual membrane sections 61. Inner cap 35 is a unitary, all-plastic member, except for the optional liner 46, which is a separately fabricated member and is made out of a suitable cap liner material such as either aluminum-backed pulp or foam polyetheylene.

Figure 5:
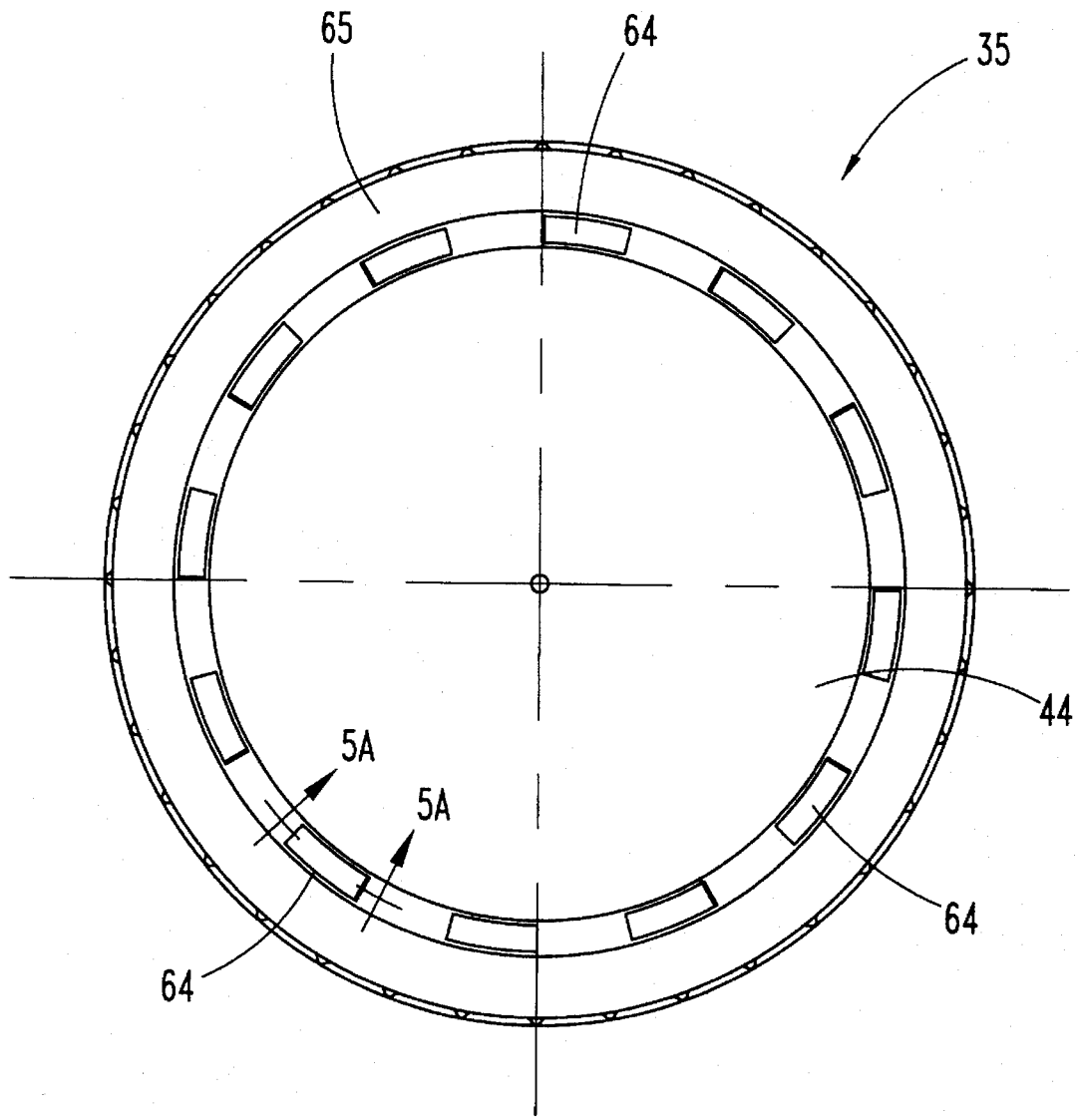
FIG. 5 is a top plan view of the FIG. 4 inner cap.
Figure 5A:
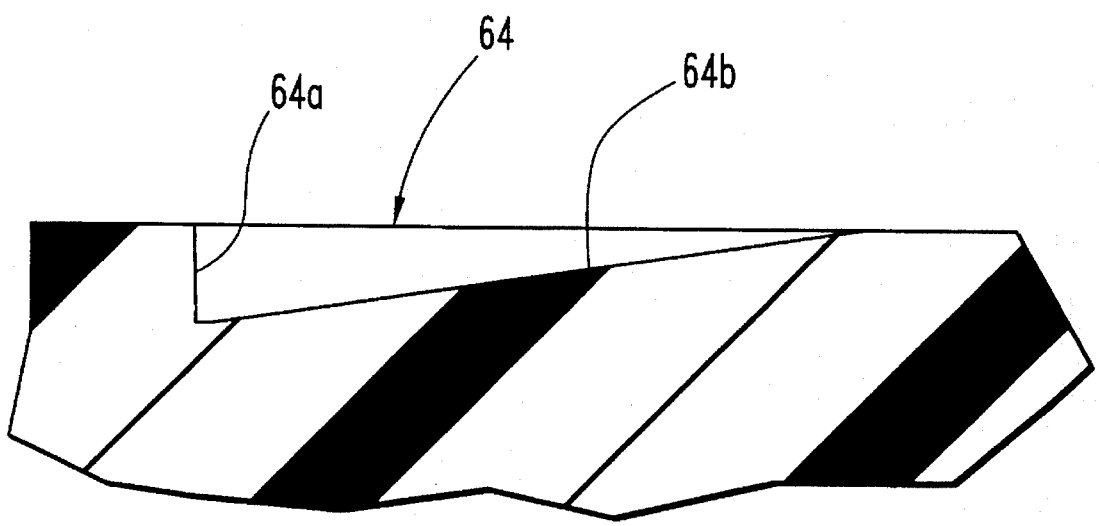
FIG. 5A is an enlarged detail of a receiving depression located in the top surface of the FIG. 4 inner cap as viewed in the direction of line 5A—5A in FIG. 5.

Inner cap 35 provides one portion of a two-cap assembly which provides a child-resistant feature. In order to provide this feature, ratchet tooth engagement is employed with an annular series of receiving depressions 64 being molded down into the upper surface 65 of the inner cap 35 (see FIG. 5). Each depression includes an axial wall 64a and an inclined ramp portion 64b (see FIG. 5A). This design permits free counterclockwise rotation of the outer cap due to the orientation of its ratchet teeth. However, any clockwise rotation to try and advance the inner cap onto the neck finish results in ratchet tooth abutment up against axial walls 64a. It should be understood that the outer cap 36 has a slight axial preload onto inner cap 35 due to the snap fit assembly between the two caps as will be described. This slight preload actually forces the ratchet teeth up against the receiving depressions 64 and upper surface 65. Consequently, while the outer cap is free to rotate in a counterclockwise direction, there is slight friction between the two due to the preload.

Figure 6:
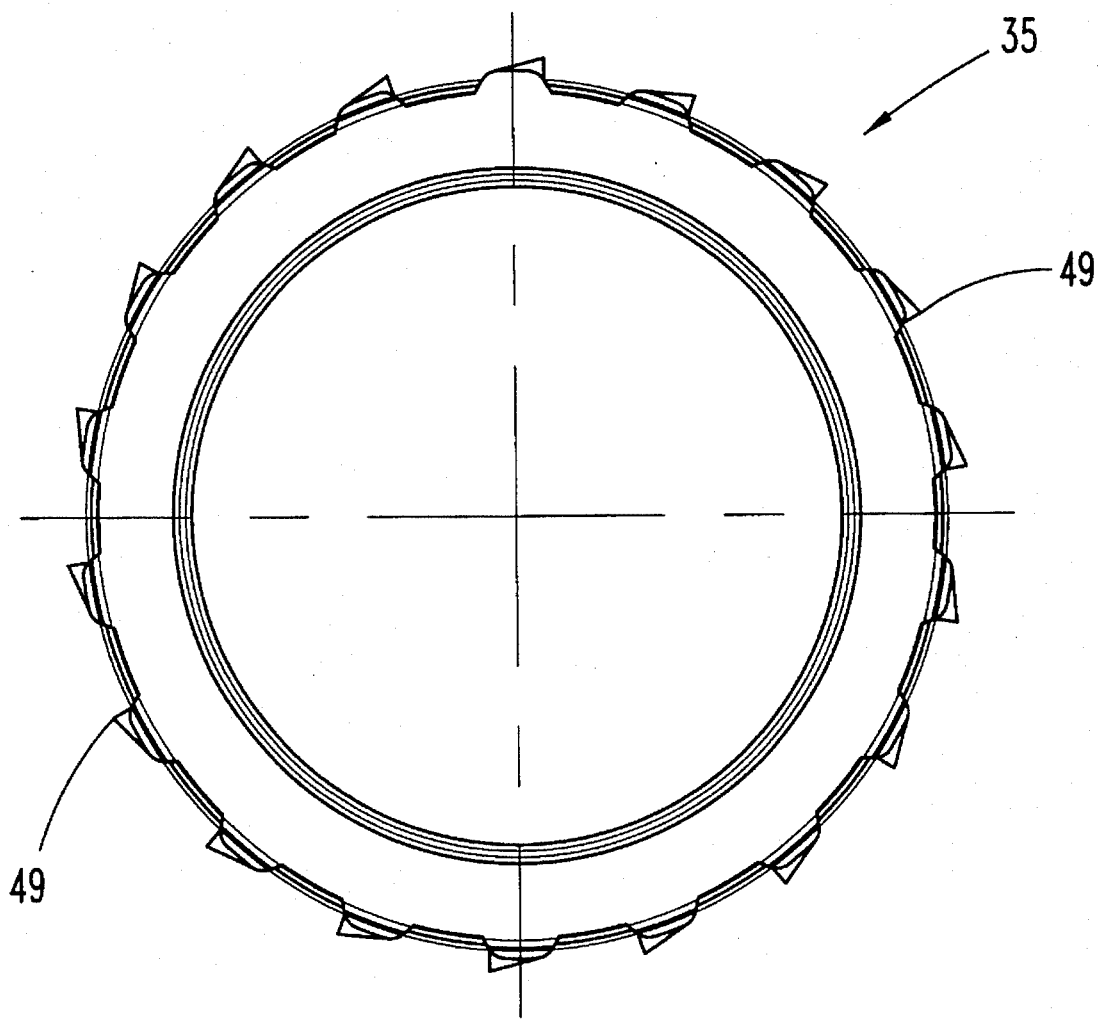
FIG. 6 is a bottom plan view of the FIG. 4 inner cap.
Figure 7:
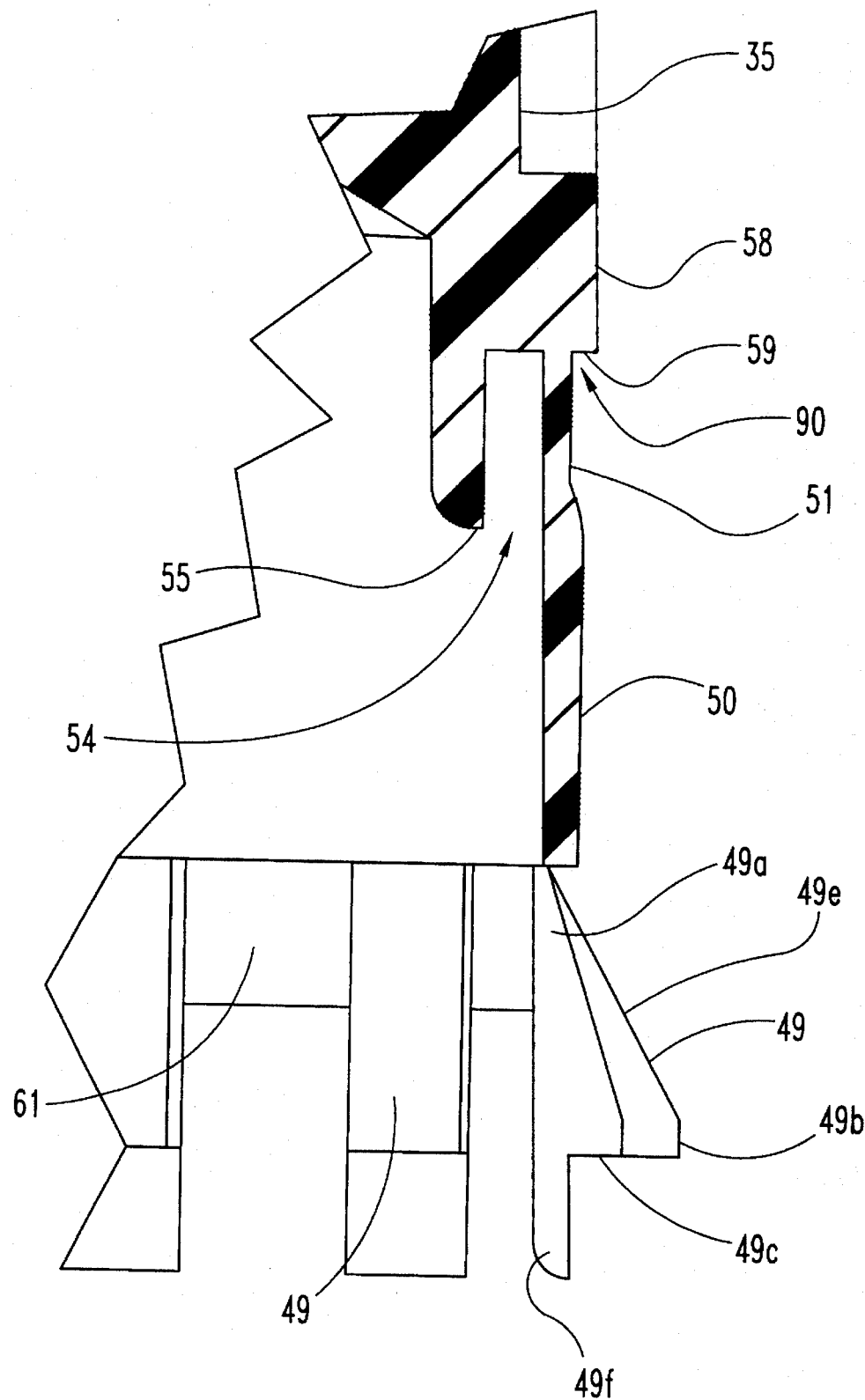
FIG. 7 is an enlarged, partial section view of the FIG. 4 inner cap according to the present invention.
Figure 8:
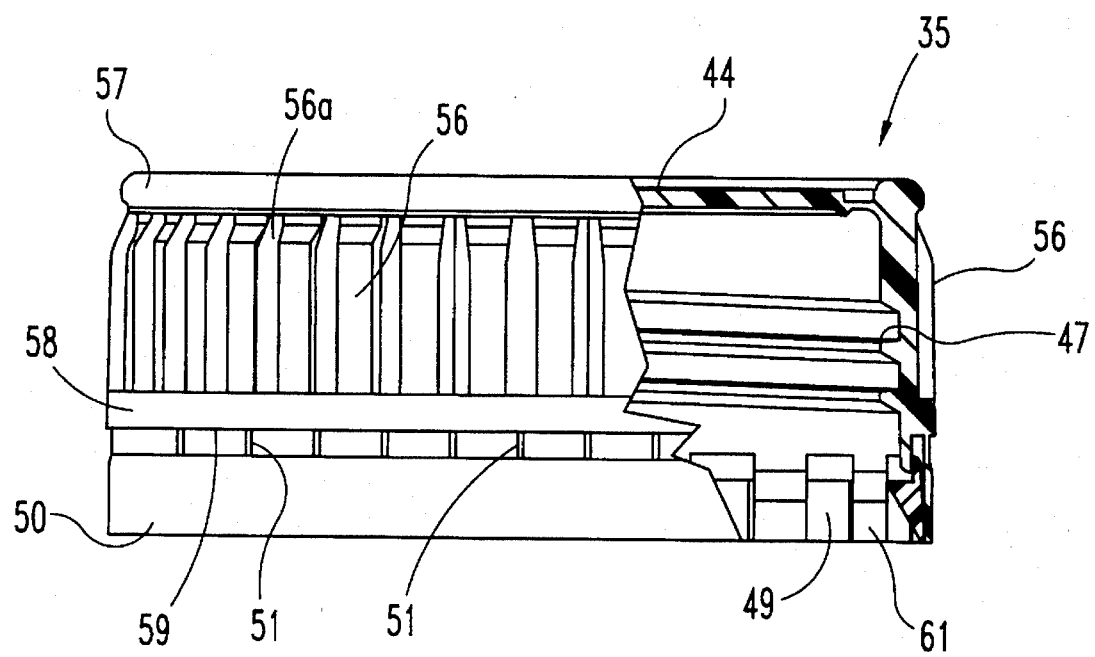
FIG. 8 is a front elevational view in partial section of the FIG. 4 inner cap with the interlocking tabs folded upwardly and locked in position behind an annular bead which is formed on the interior of the inner cap.
Figure 9:
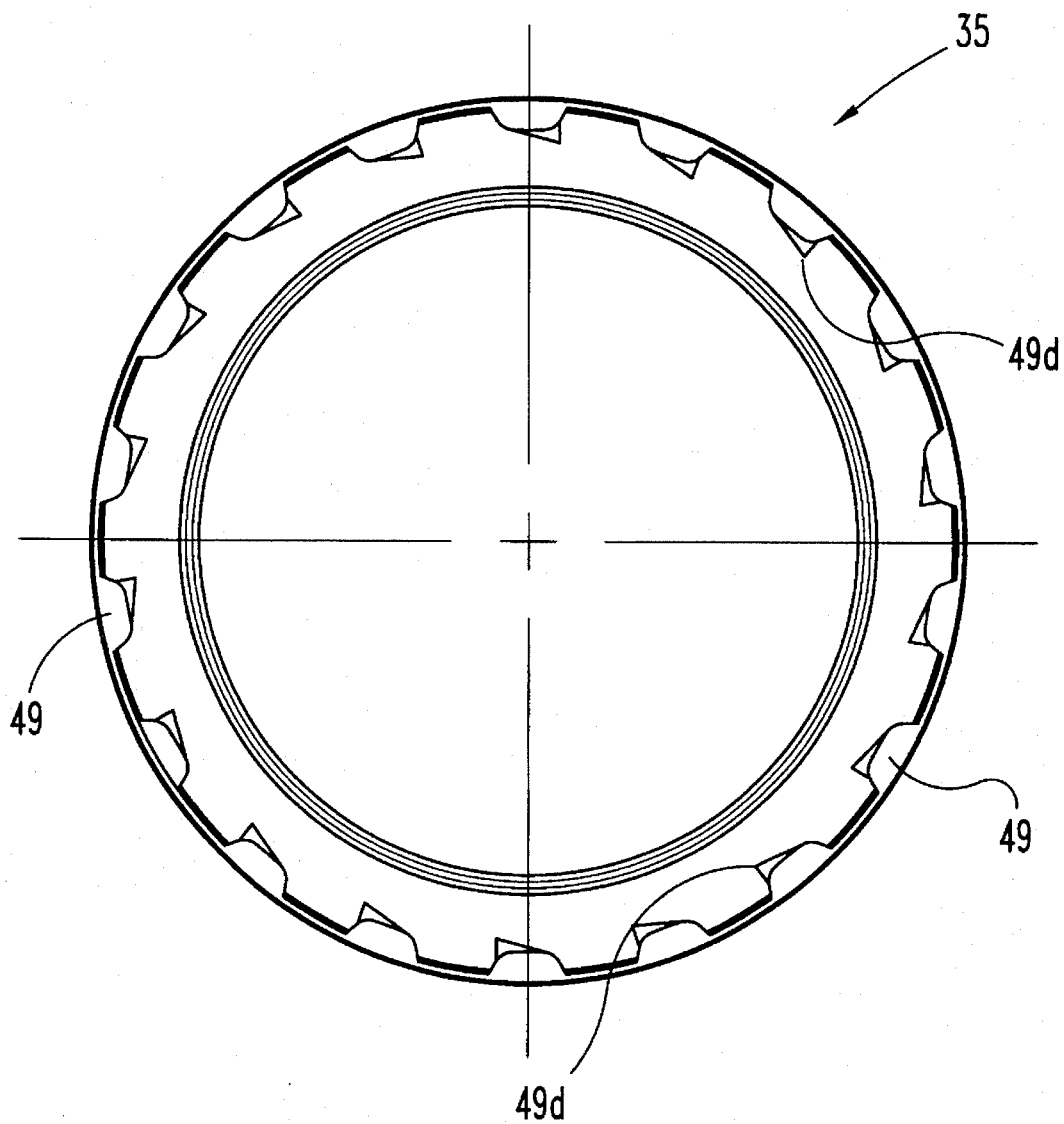
FIG. 9 is a bottom plan view of the FIG. 8 inner cap.

In FIG. 7 the enlarged details of the tabs 49, annular channel 54, annular bead 55, and membrane sections 61 are illustrated. The final orientation of the folded tabs 49 is illustrated in FIG. 10. In FIGS. 8 and 9, the inner cap is illustrated once the tabs are folded into the annular channel 54 behind annular bead 55. While FIGS. 4 and 8 are for the most part similar to each other, the lower portion as illustrated in FIG. 8 is different due to the fact that the tabs are now folded upwardly and disposed in a locked position. Accordingly, FIGS. 6 and 9 are similar to each other as are FIGS. 7 and 10. It will be noted that the top plan view does not change as the folding of the tabs 49 has no visual effect on the top plan view.

It is to be understood that the child-resistant feature of the present invention is provided by the ratchet tooth and depression 64 engagement. Therefore, elimination of the outer cap 36 will eliminate the child-resistant aspect of the present invention. This means that the same inner cap design can be used with or without the child-resistant capability. To convert the inner cap 35 into a child-resistant combination, the outer cap 36 is simply pressed down over the inner cap in a substantially concentric manner and then snapped into position with a slight preload, as previously mentioned. Thereafter, the interaction of the ratchet teeth on the inside surface of the top wall of the outer cap with the receiving depressions 64 on the upper surface of the inner cap means that the outer cap is able to turn without engagement in the counterclockwise direction. Consequently, any attempt to unscrew the inner cap by way of ratchet engagement is not possible. However, ratchet tooth and depression engagement is effective to advance the inner cap 35 onto the neck finish 32 by means of advancing rotation of the outer cap 36.

Referring now to FIGS. 11–14, the details of the outer cap 36 are illustrated. Outer cap 36 is a unitary, molded plastic cap of a substantially cylindrical shape with an annular top wall 70. The circular center portion 71 of the top wall 70 is open, leaving an annular ring portion 72 extending radially inwardly from sidewall 73. The underside surface 74 of portion 72 includes a circumferential series of ratchet teeth 75 which are shaped, oriented, and positioned so as to be in alignment with the circumferential pattern of receiving depressions 64 in the upper surface 65 of upper wall 44 of inner cap 35.

Figure 11:
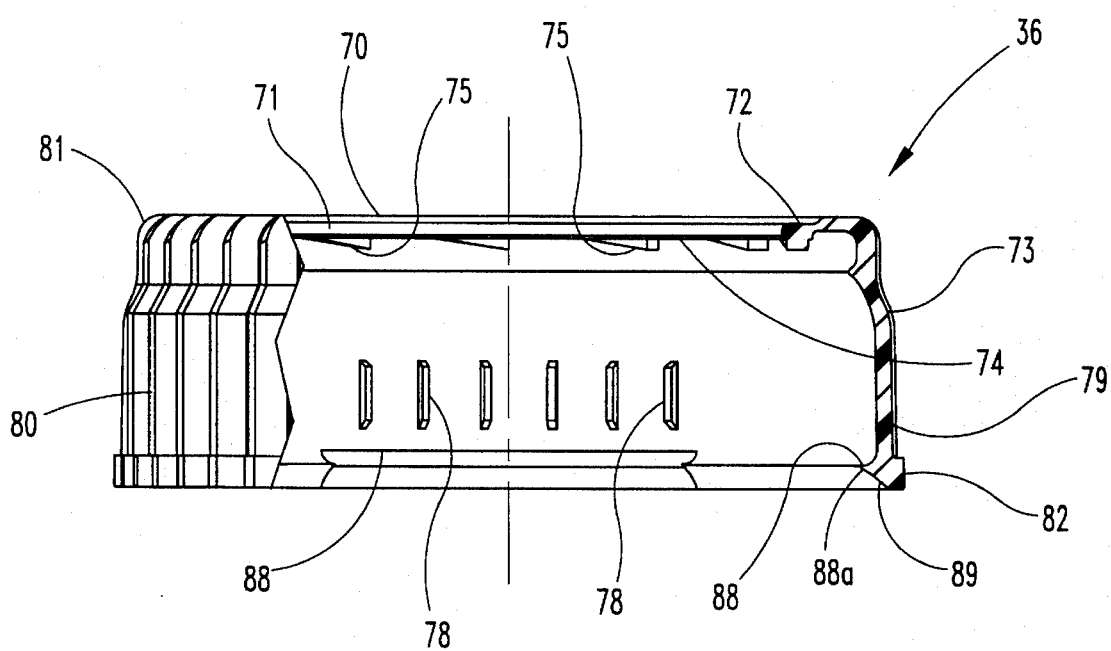
FIG. 11 is a front elevational view in partial section of an outer cap comprising a portion of the FIG. 1 closure according to the present invention.
Figure 12:
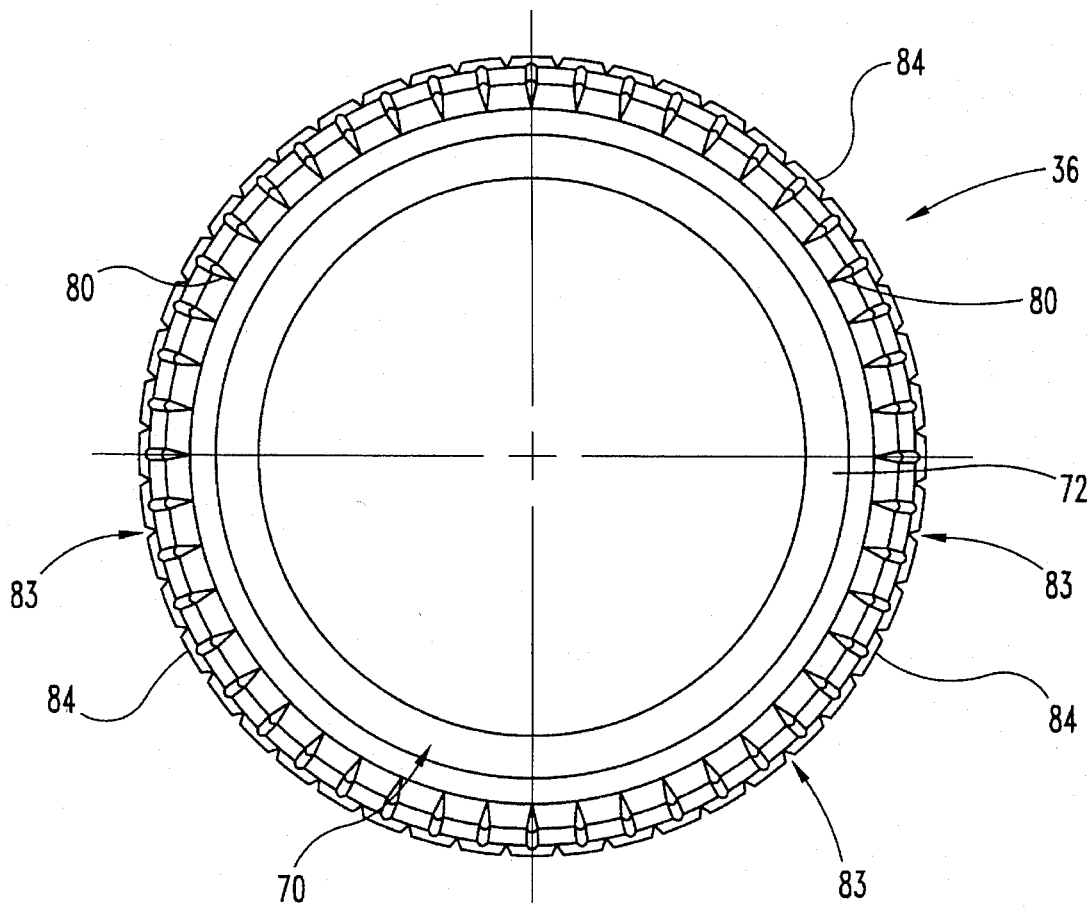
FIG. 12 is a top plan view of the FIG. 11 outer cap.
Figure 13:
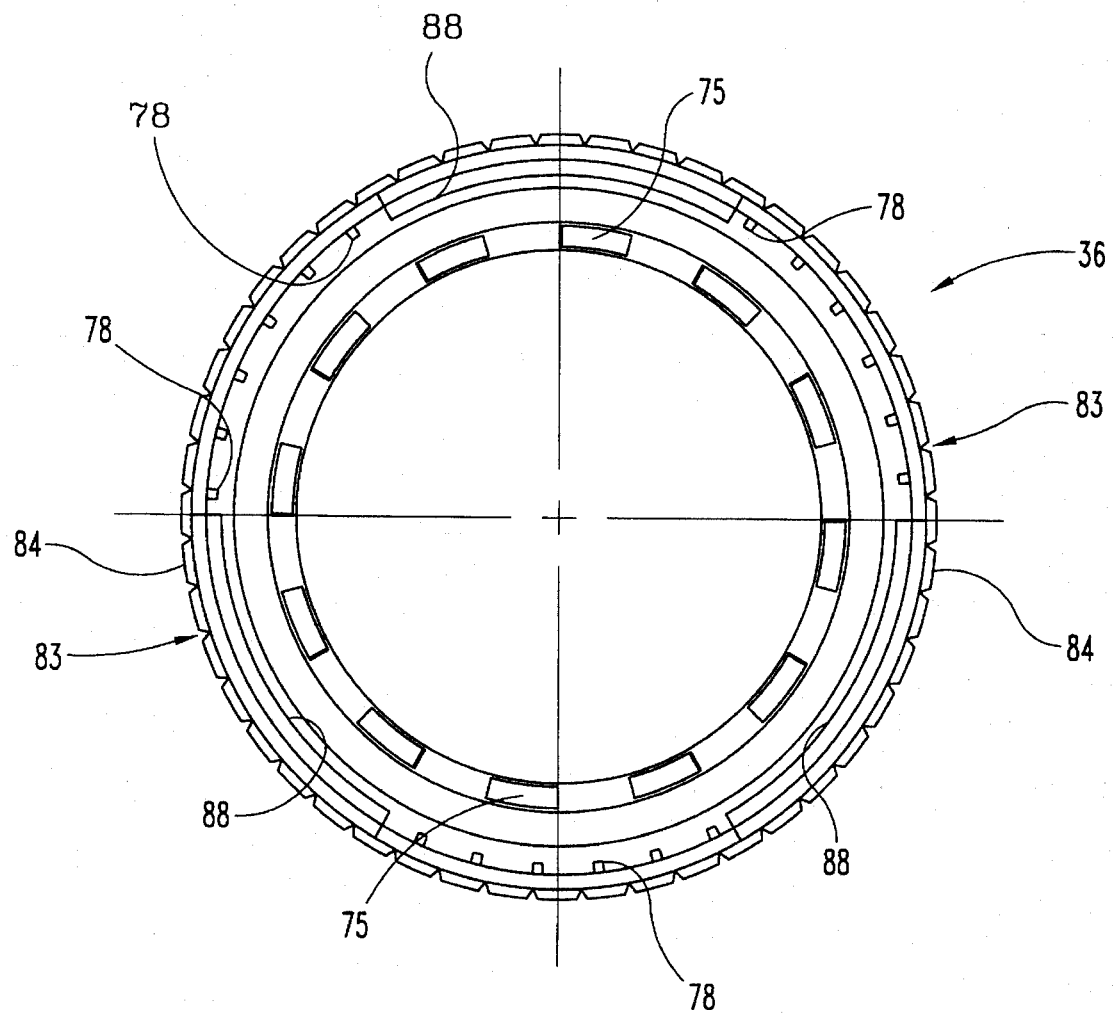
FIG. 13 is a bottom plan view of the FIG. 11 outer cap.

The partial section view of FIG. 11 illustrates the triangular shape of ratchet teeth 75. The teeth which are illustrated are on the rear or back side of ring portion 72 as the front side is removed for the partial section illustration. This understanding is important to be able to appreciate that the outer cap 36 rotates without ratchet engagement relative to depressions 64 in a counterclockwise direction and with ratchet engagement when rotated in a clockwise direction. Consequently, any attempt to remove the inner cap by means of ratchet engagement with the outer cap will not be successful. Turning of the outer cap is representative of the type of effort a child would perform in trying to open the container. Since the inner cap is not loosened by simply counterclockwise turning of the outer cap, the container and cap assembly combination of the present invention is made child-resistant.

While there is a way to remove the inner cap 35 by way of the outer cap 36 and thereby open the container 31, the manual manipulations which are required to perform this task are not able to be performed by children. Due in part to hand size limitations and due in part to strength limitations, the required opening procedure is something which children cannot normally perform. While the age of the child is a consideration, the older the child, presumably the more mature and the risks of improper opening are less.

In order to remove the inner cap 35 and thereby open the container, the sidewall 73 of the outer cap 36 is compressed by the manual application of inwardly directed compressive forces which are substantially 180 degrees apart on the sidewall of the outer cap. This form of cap compression ovalizes the sidewall and, as a result, places two oppositely-disposed portions of the sidewall 73 in contact or at least close proximity with the outer wall of the inner cap 35 and more specifically in close proximity with axial ribs 56.

While high frictional forces in a radial direction between contacting surfaces of the inner and outer caps can be sufficient to remove the inner cap 35, there is additional assistance provided by three spaced-apart series of axial ribs 78 which are formed on the inside surface of the sidewall of the outer cap. Each of these three series includes six axial ribs and each series extends circumferentially for approximately 60 degrees. Further, each of these three series are separated by approximately 60 degrees of open wall area. As the axial ribs 78 are compressed into closer proximity to axial ribs 56 on the inner cap 35, some rib-to-rib interfit will normally occur thereby enabling rib-to-rib engagement in a circumferential direction, thereby facilitating the effort to remove the inner cap. While this rib engagement is not ratchet tooth engagement because it is not unidirectional in nature, it is still helpful and lessens to some degree the extent of compressive forces which are required in order to obtain sufficient frictional contact for inner cap 35 to be removed by the counterclockwise rotation of outer cap 36. It is not necessary to position the sidewall compressive forces at specific locations relative to the three series of axial ribs 78. The fact that there are three series 60 degrees apart is sufficient to put at least a few of the ribs into engagement. The annular ring shape of top wall 70 which creates open center portion 71 makes the ovalizing of sidewall 73 somewhat easier as compared to a cap with a solid (covered) center portion.

The outer surface 79 of sidewall 73 includes a circumferential series of slightly raised, relatively thin axial ribs 80 which extend from top edge 81 to bottom rib 82. Rim 82 is notched with a uniformly-spaced series of V-shaped notches 83. The V-shaped notches 83 create uniformly spaced rim portions 84. The axial ribs 80 are oriented relative to the rim portions 84 such that each rib intersects a corresponding rim portion in its approximate center. Consequently, each V-shaped notch is located at the approximate midpoint between adjacent axial ribs 80. The addition of notches 83 serves to relieve the compressive forces so that the outer cap 36 is easier to ovalize for removal of the inner cap. The notches provide a place for the material to go as ovalizing occurs.

Figure 14:
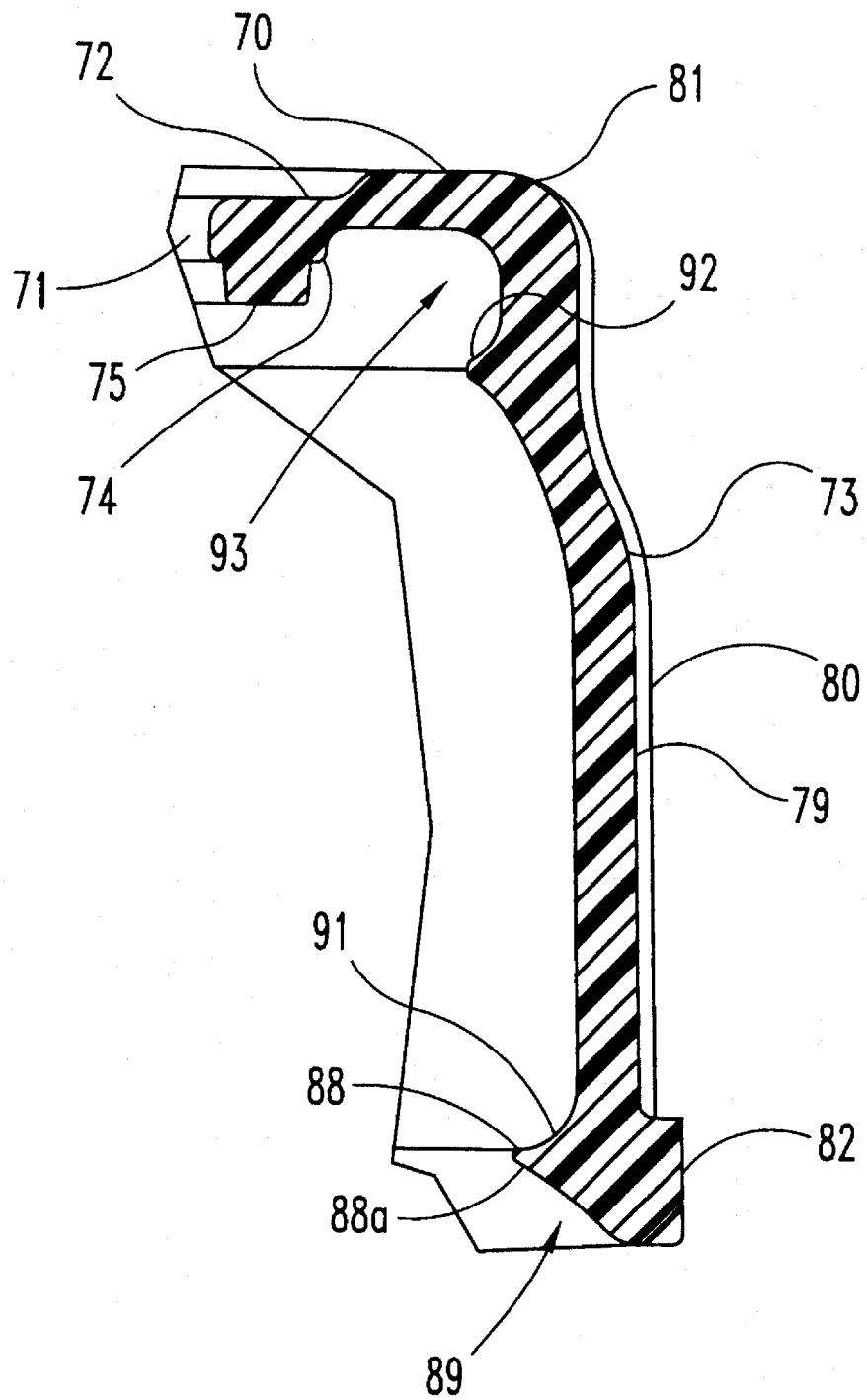
FIG. 14 is an enlarged partial section view of one portion of the FIG. 11 outer cap.

As previously mentioned, outer cap 36 is designed with a size and shape to fit down over and around inner cap 35 in a substantially concentric manner. Slight radial clearance is designed into the sizes of the respective caps so as to enable the outer cap 36 to rotate in a counterclockwise direction relative to the inner cap 35, noting the preload between the two caps and the slight frictional interference which is created. In order to securely hold the outer cap onto the inner cap in the axial direction once the outer cap is applied, three radially-inward lips 88 are positioned on the inside surface 89 of bottom rim 82. Each lip 88 has a substantially triangular shape as is illustrated in FIG. 14 and extends circumferentially for approximately 60 degrees. The three lips 88 are equally spaced apart and each one is positioned in between adjacent series of axial ribs 78. The axial height of outer cap 36 relative to inner cap 35 is such that the three lips 88 are positioned below lower edge 58 of the inner cap 35. The upwardly inclined lower surface 88a of each lip 88 enables the outer cap to slide more easily over lower edge 58 before snapping into final position. It should be noted at this point that the frangible elements 51 are inset slightly in a radially inward direction, thereby leaving a slight recess 90 below lower edge 58. This recess 90 is engaged by the upper surface 91 of each lip 88.

Figure 17:
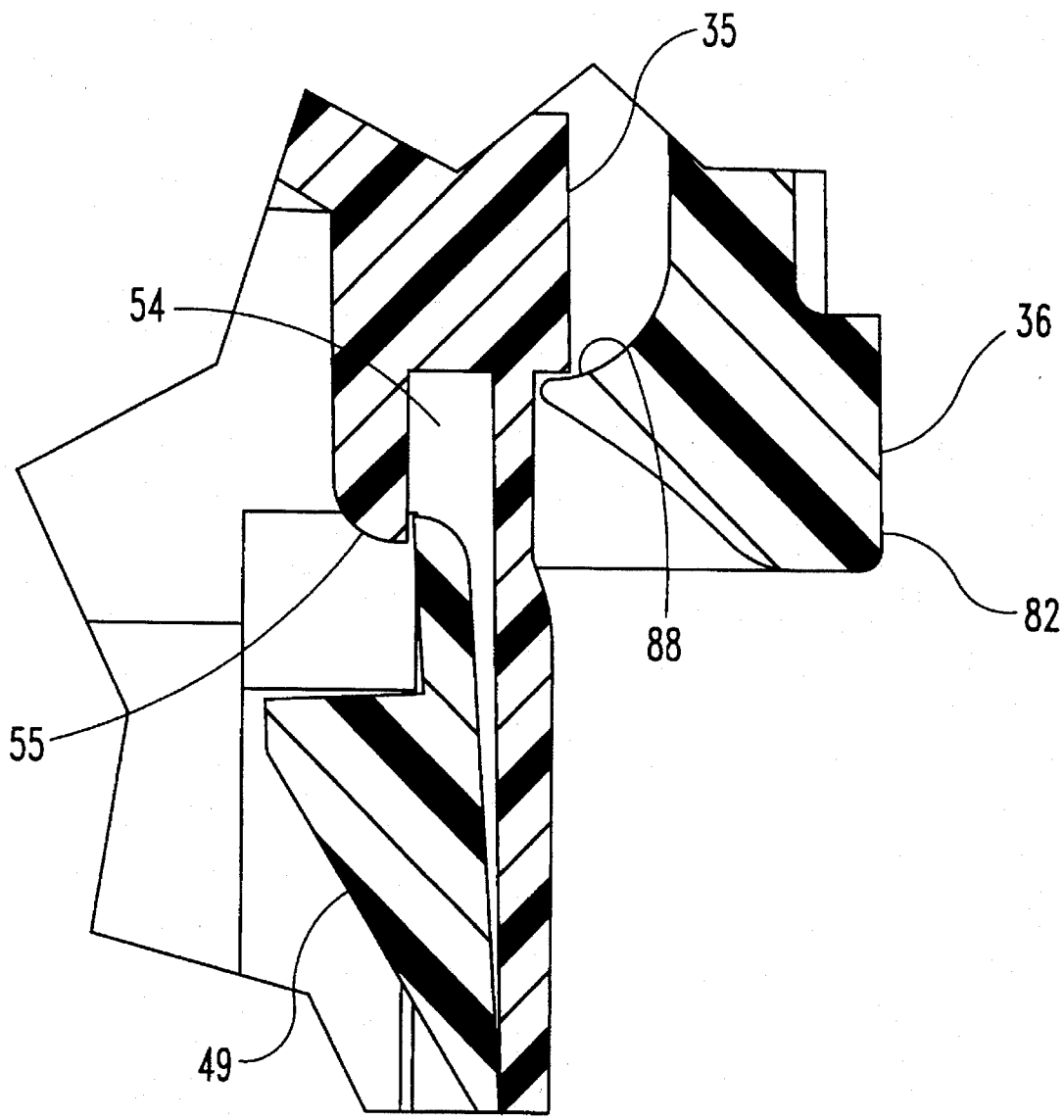
FIG. 17 is an enlarged detail in full section of the lower, outer portion of the FIG. 8 and FIG. 15 caps showing another area of engagement between the inner and outer caps.

This style of cap engagement is illustrated in FIG. 17 and it is clear from this drawing figure that the frangible elements 51 can be severed from the lower edge 58 for separation of the break-away ring 50 without affecting the snap-fit engagement of lips 88 within recess 90 below lower edge 58. This particular configuration means that the inner cap 35 can be configured without the tamper-evident feature and yet still receive the outer cap for creating a child-resistant closure. It is also a fact that even if the inner cap is initially designed as a tamper-evident cap, once the container is initially opened and the tamper-evident ring breaks away from the remainder of the cap, the cap can still retain its child-resistant capabilities.

Figure 15:
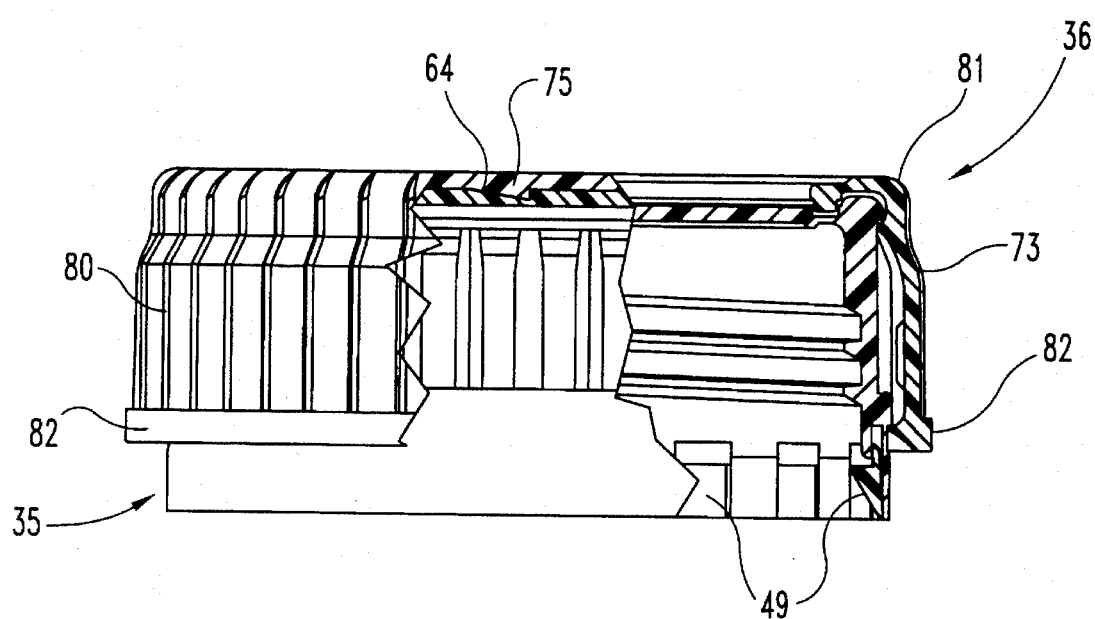
FIG. 15 is a front elevational view in partial section of the FIG. 11 outer cap snapped into position over the FIG. 8 inner cap in accord with the present invention.
Figure 16:
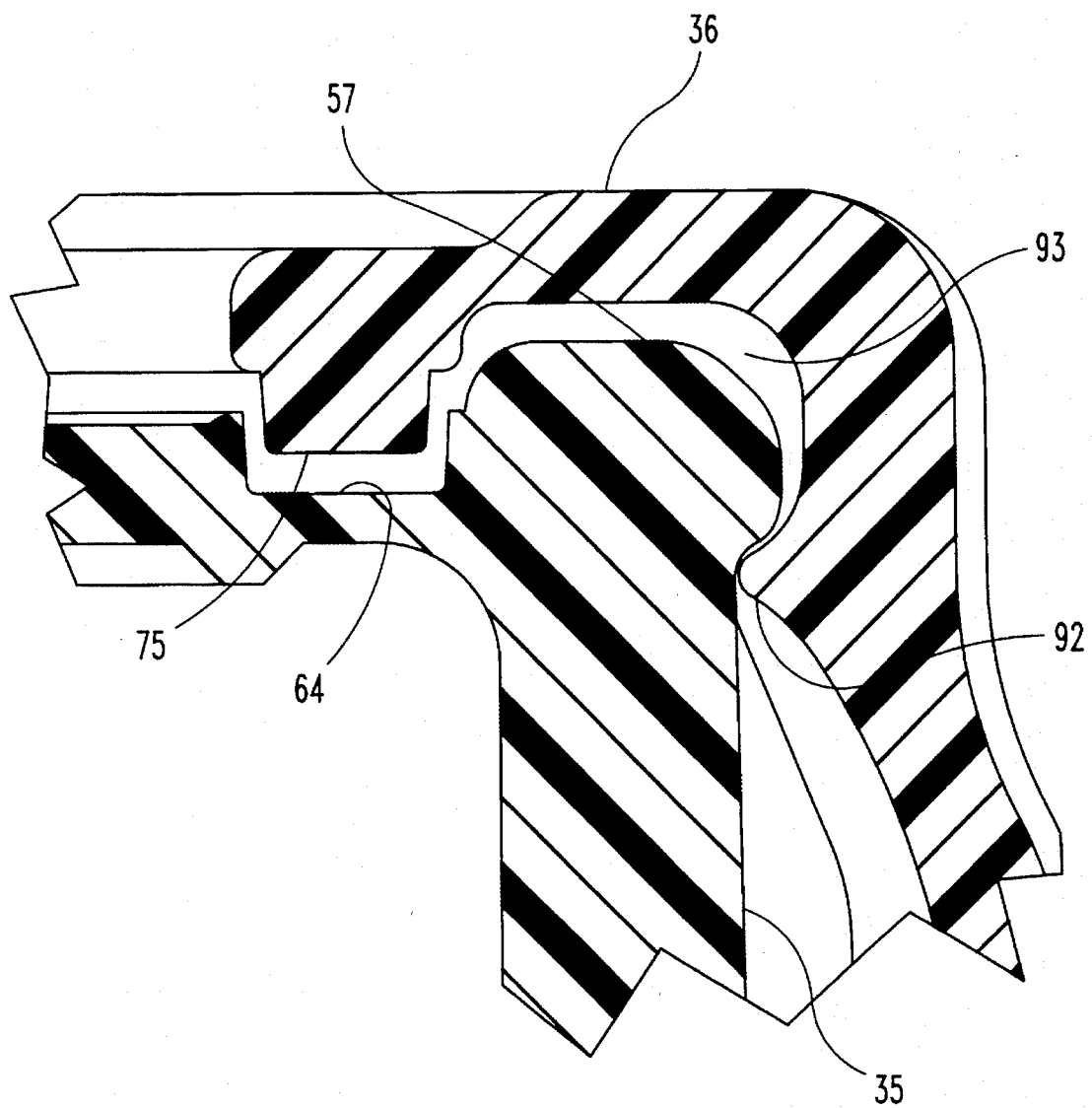
FIG. 16 is an enlarged detail in full section of the upper, outer corner of the FIG. 8 and FIG. 15 caps showing one area of engagement between the inner and outer caps.

Referring to FIGS. 15–17, the engagement between outer cap 36 and inner cap 35 is illustrated. Included are two enlarged detail views which illustrate the engagement of lips 88 and a second location of engagement by outer cap 36 around top rim 57. Radially inward upper lip 92 is circumferential and extends below top rim 57. The combination of lip 92, top wall 70 and the top edge 81 connecting portion therebetween creates and defines an annular pocket 93 into which the annular top rim 57 is received. The top rim 57 has a curved outer contour in lateral section which approximates the lateral shape of pocket 93. Also illustrated in FIG. 16 is the positioning of one ratchet tooth 75 down into one of the receiving depressions 64. The engagement of upper lip 92 below top rim 57 also serves to axially secure the outer cap 36 to the inner cap 35 and to radially position the two caps relative to each other. Since the series of three lips 88 and annular lip 92 both serve to axially position and secure the outer cap 36 onto the inner cap 35, each location can be thought of as either the primary or the secondary location of axial engagement between the two caps.

Figure 18:
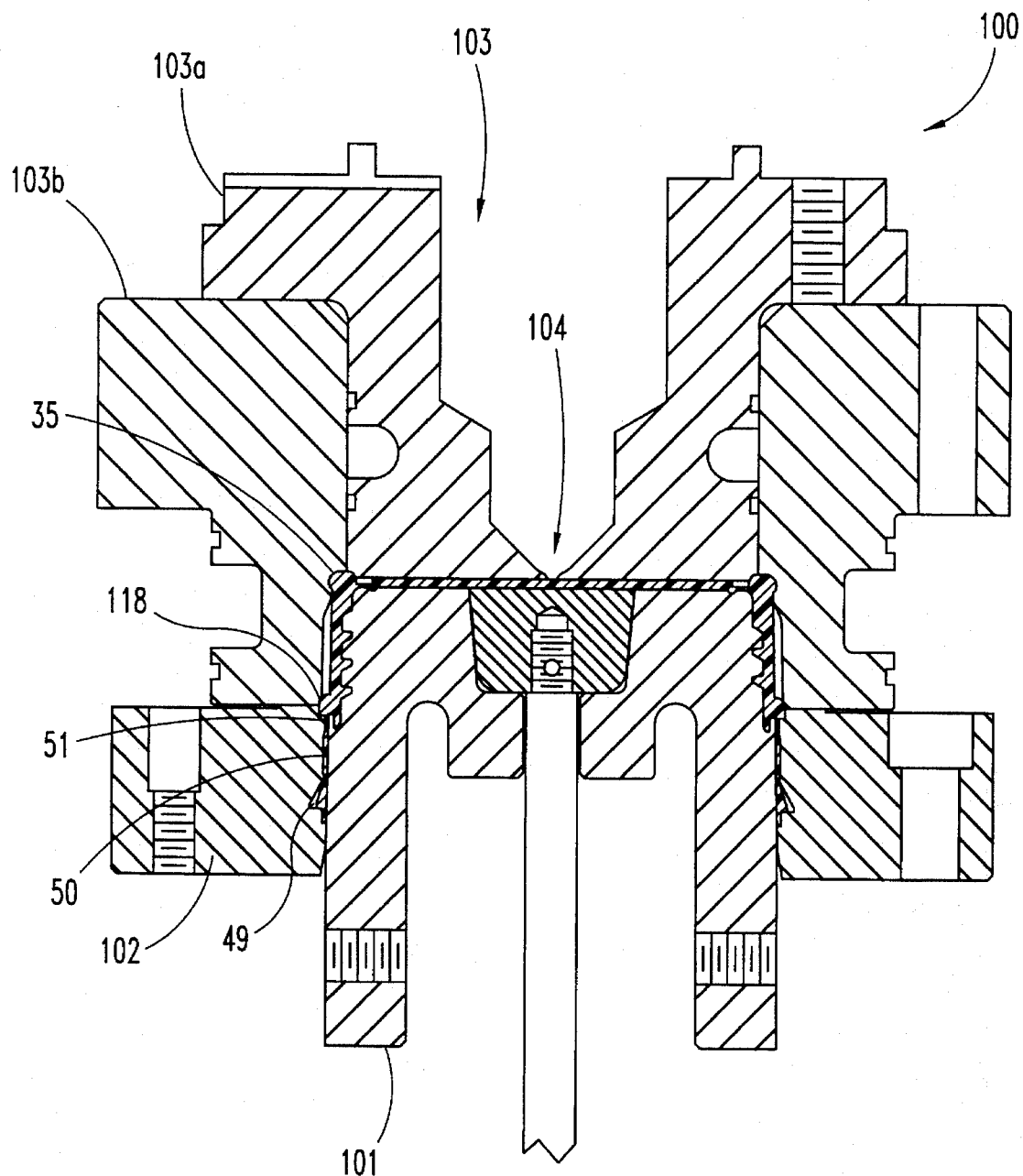
FIG. 18 is a partial, front elevational view in full section of the mold arrangement utilized for the injection molding of the FIG. 4 inner cap.

Referring to FIG. 18, the mold arrangement 100 used for manufacturing the inner cap 35 of the present invention is illustrated. While there are a number of mold components, the primary focus is on the inner core 101 and outer ring 102 which cooperate to provide the required mold cavity for the frangible elements 51, break-away ring 50 and the ratchet-like tabs 49. The top portion 103 of the mold arrangement 100 includes an inner section 103a and a cooperating outer section 103b. The arrangement and location of the parting line between these two sections enables the top portion to be separated and removed from the molded inner cap 35. The combination of sections 103a and 103b creates a substantially cylindrical, cup-shaped member which includes nozzle 104 for the introduction of molten plastic into the mold cavity. Nozzle 104 is centrally positioned in inner section 103a.

Figure 19:
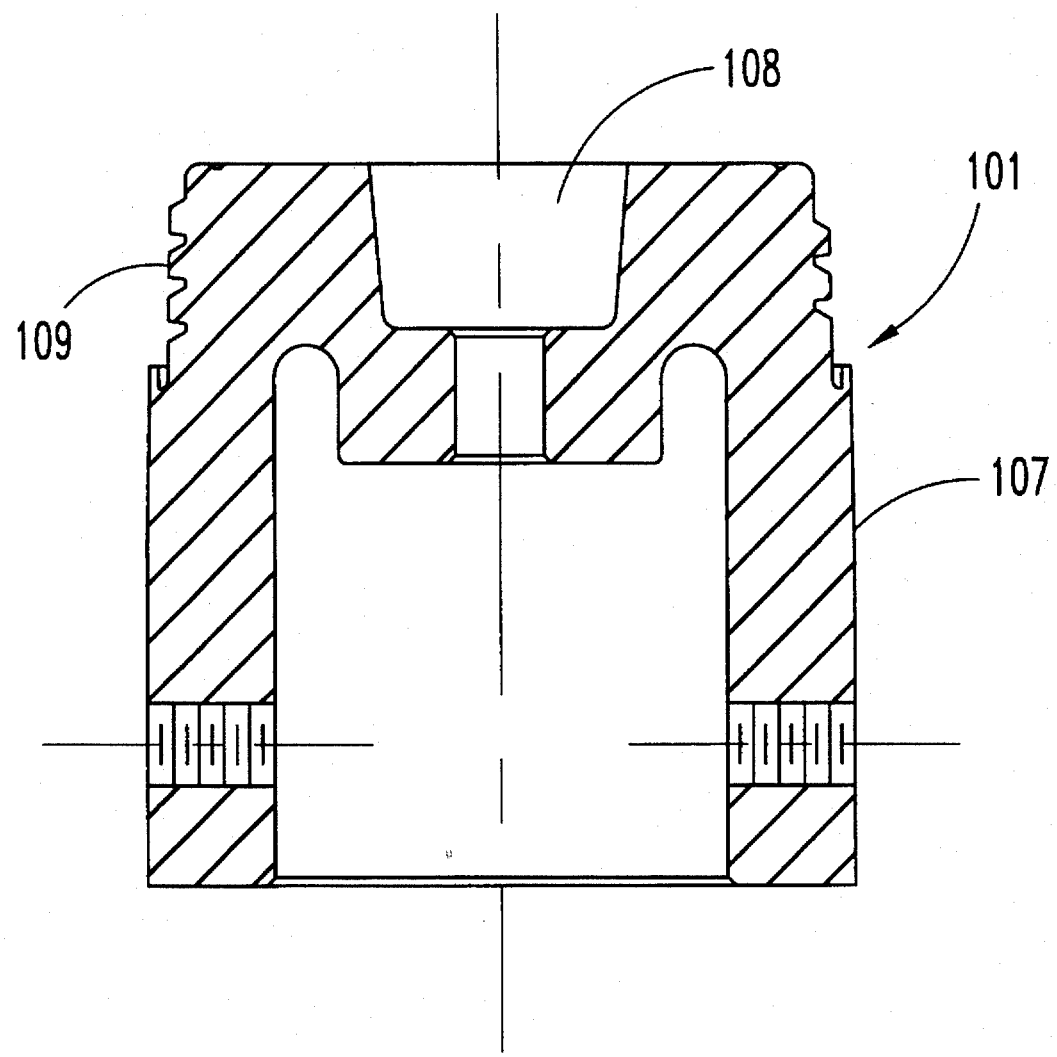
FIG. 19 is a front elevational view in full section of the inner core which comprises a portion of the FIG. 18 mold arrangement.
Figure 20:
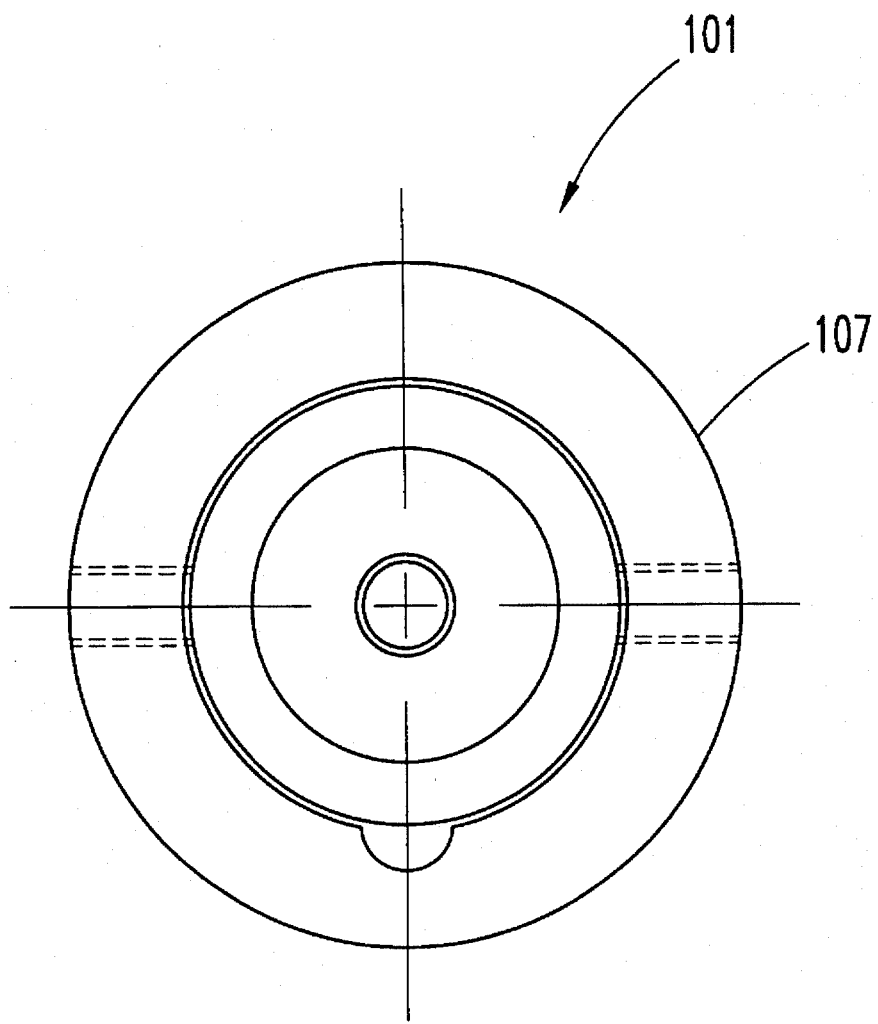
FIG. 20 is a bottom plan view of the FIG. 19 inner core.

The inner core 101 is illustrated in greater detail in FIGS. 19 and 20 where FIG. 19 is a front elevational view in full section and FIG. 20 is a bottom plan view. The inner core 101 in cooperation with top portion 103 defines a mold cavity for the upper portion of the inner cap. In particular, the inner core 101 is contoured so as to create a mold cavity for internal threads 47, upper wall 44, side wall 56 and axial ribs 56a. As illustrated in FIGS. 19 and 20, the inner core 101 includes a substantially cylindrical body 107, a center aperture 108 and a thread portion 109.

Figure 21:
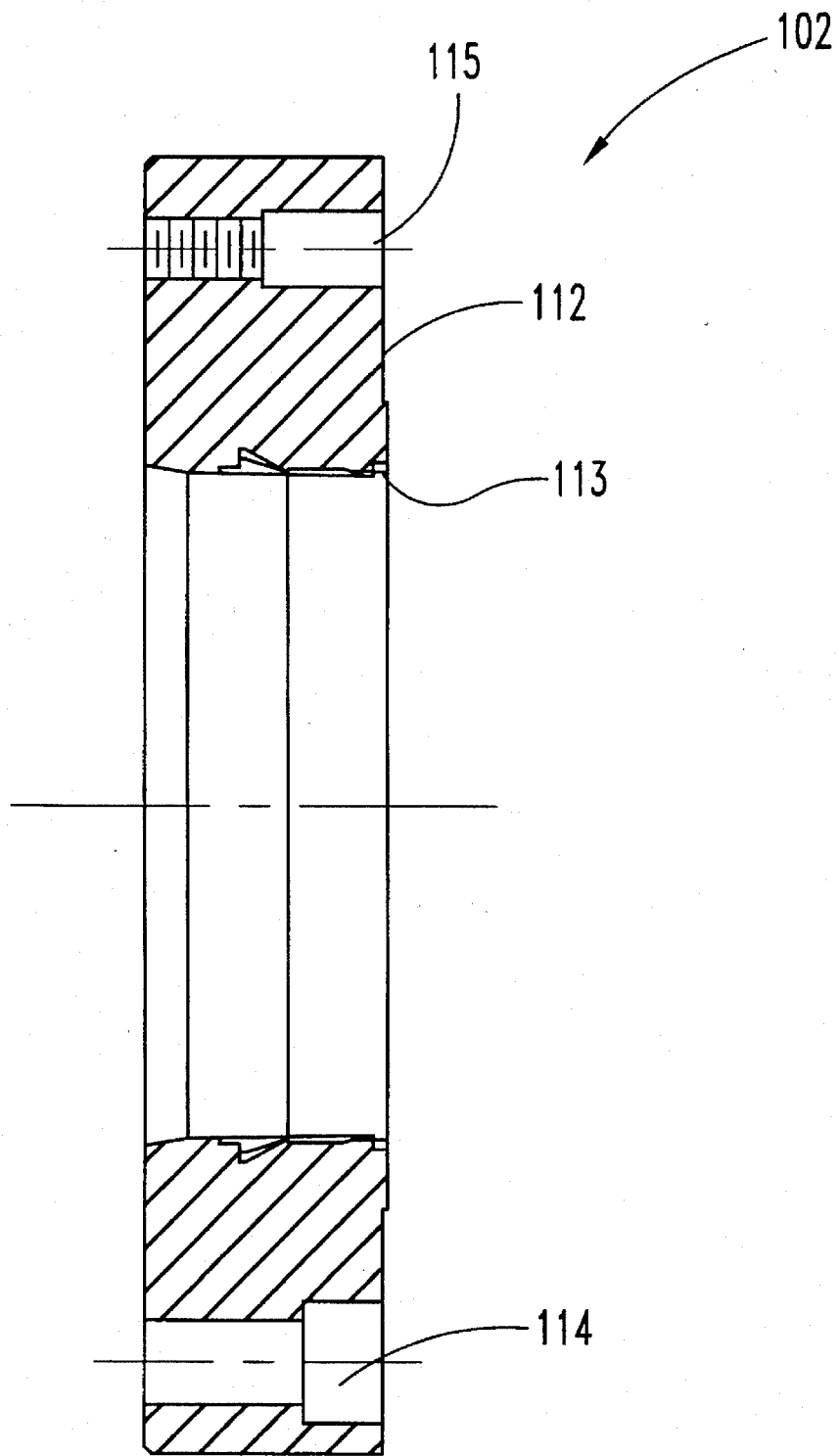
FIG. 21 is a front elevational view in full section of the outer ring which comprises a portion of the FIG. 18 mold arrangement.
Figure 22:
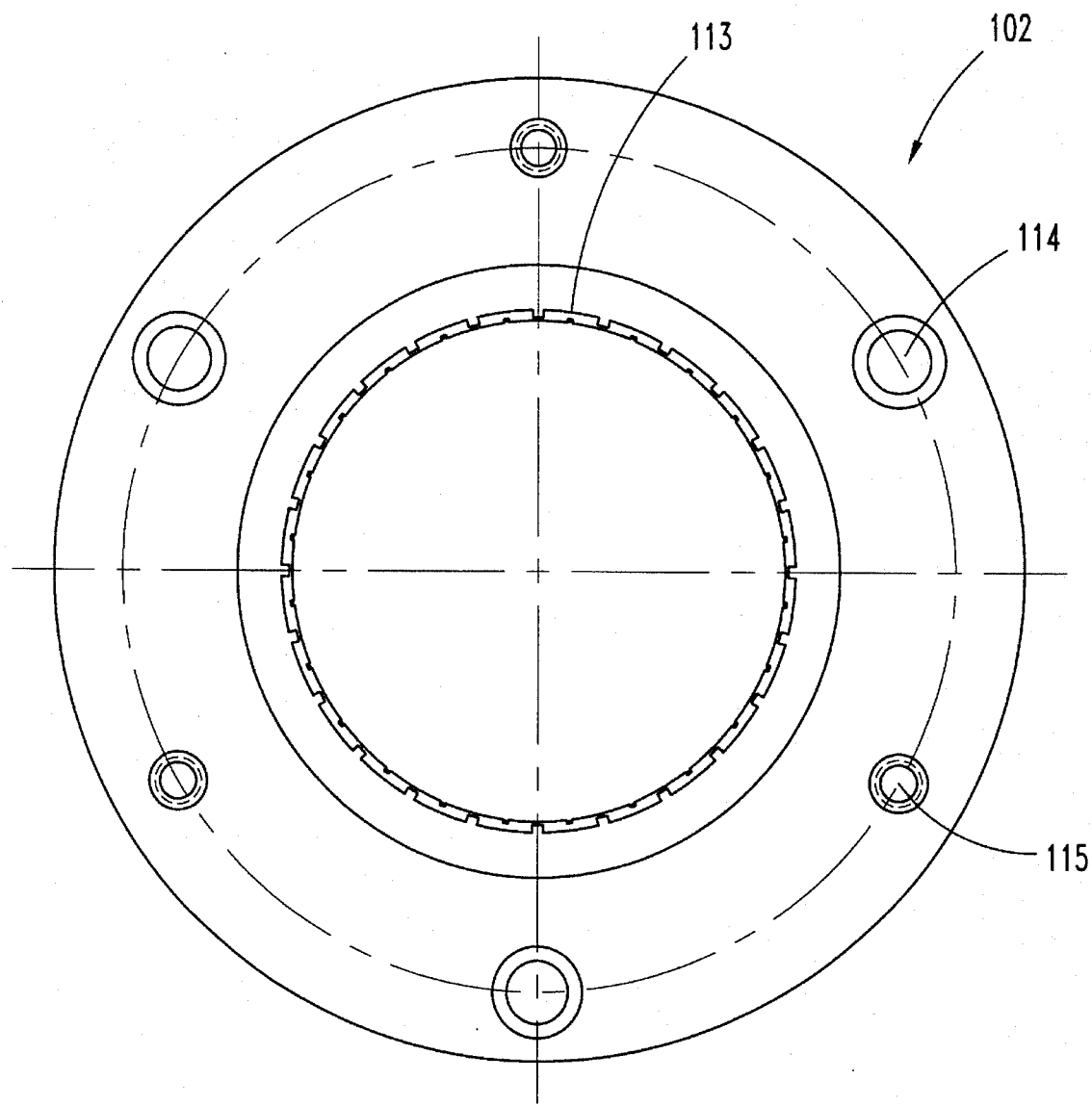
FIG. 22 is a top plan view of the FIG. 21 outer ring.
Figure 23:
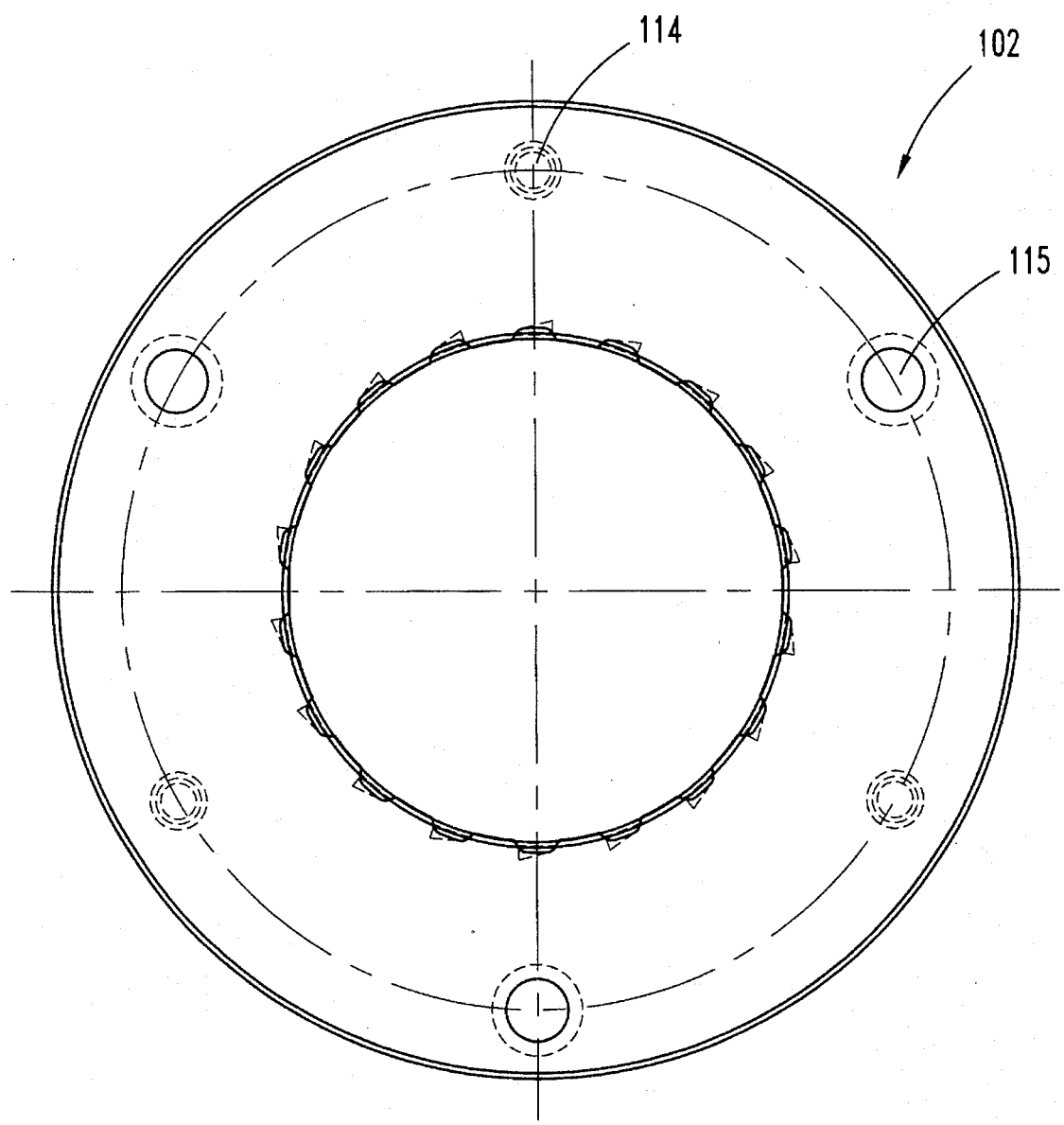
FIG. 23 is a bottom plan view of the FIG. 21 outer ring.

Referring to FIGS. 21, 22 and 23 the substantially cylindrical outer ring 102 is illustrated in greater detail. The full section view of FIG. 21 accurately details the outer ring including the interior shaping and contouring which creates the mold cavity for the frangible elements 51, ring 50 and tabs 49. The top plan view of FIG. 22 and the bottom plan view of FIG. 23 complete the detailing of the outer ring 102. The outer ring is a unitary member which moves axially into and out of its molding orientation. Due to the design of the inner core 101 and outer ring 102, and by factoring into the mold design the anticipated shrinkage of the molded plastic, the design of the outer ring 102 can be made as a unitary member. A unitary design avoids the need for a split block mold thereby avoiding the requirement for more expensive tooling and higher maintenance tooling which are generally recognized as disadvantageous when split lock tooling is utilized.

The body portion 112 of outer ring 102 is substantially cylindrical with square notch relief in the inside upper edge 113. The notch relief provides the mold cavity for the frangible elements 51. The bolt clearance holes 114 and threaded holes 115 are each arranged in a 3-hole pattern on 120 degree spacing. These holes are used for mounting and moving the outer ring 102.

In the mold arrangement 100 of FIG. 18, the inner core 101, outer ring 102 and top portion 103 are oriented in their initial position ready for plastic to be injection molded. The defined mold cavity 118 corresponds to the desired shape for inner cap 35 after accounting for the anticipated shrinkage of the polyethylene material which represents the preferred material for inner cap 35.

Figure 24:
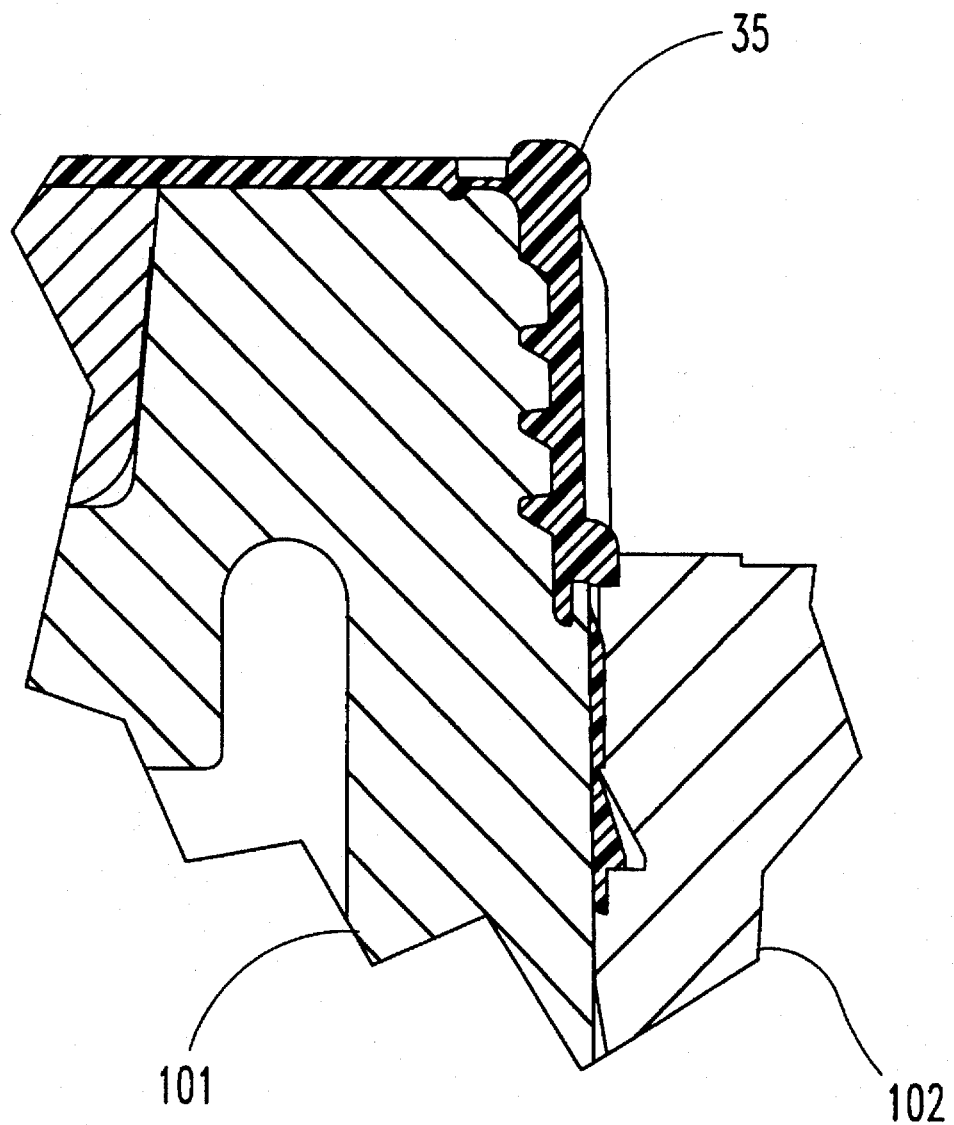
FIG. 24 is a front elevational view in full section of the FIG. 18 mold arrangement with the top portion of the mold removed.
Figure 25:
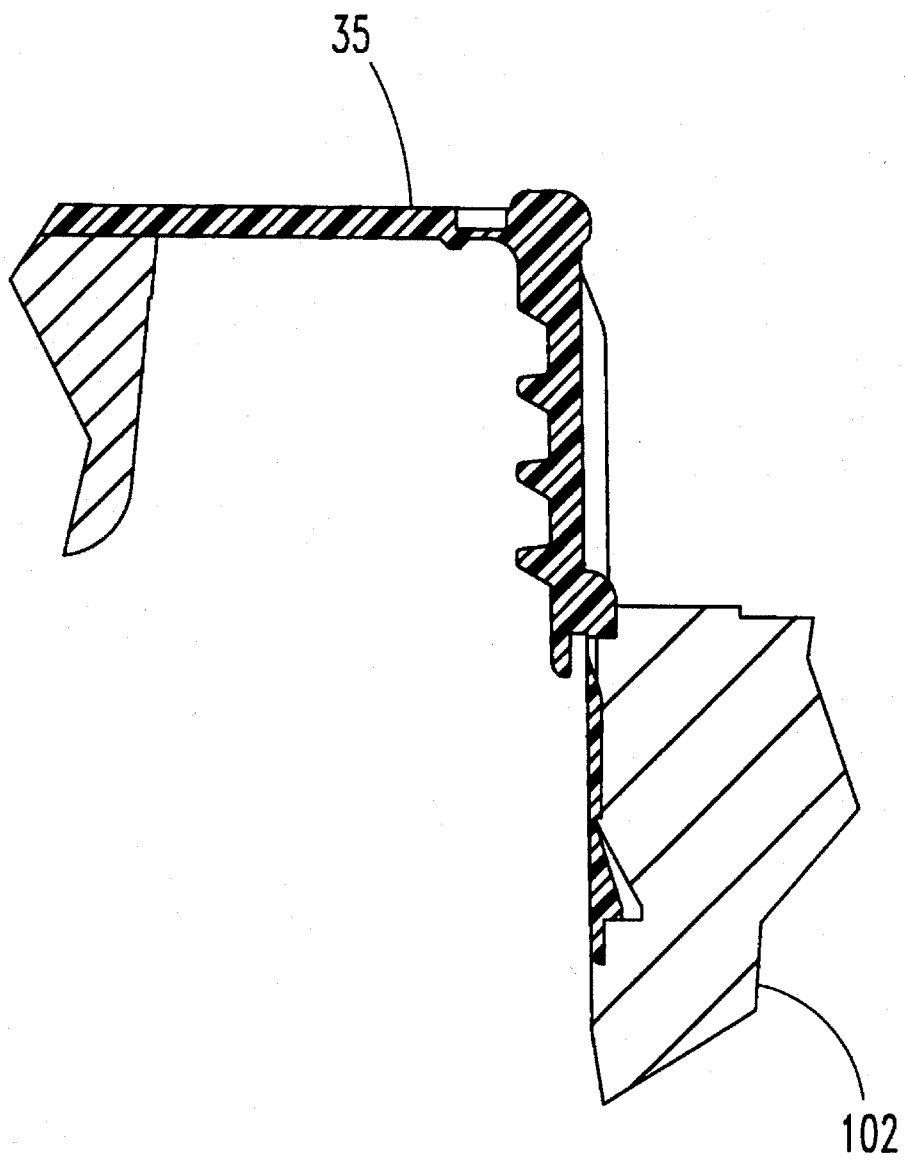
FIG. 25 is a front elevational view in full section of the FIG. 18 mold arrangement with the inner core removed.

Once the inner cap is molded, though while the plastic is still warm, the top portion 103 is able to be axially separated from the top portion of the inner cap 35 by separating sections 103a and 103b and moving each section away from the molded inner cap. The resulting configuration once the top portion 103 is removed is illustrated in FIG. 24. The next step in the ejection of the inner cap from the mold is to unscrew the inner core 101 from the molded cap. The unscrewing action effectively lowers the inner core 101 relative to the inner cap. The inner core 101 is axially lowered below the lowermost edge of tabs 49. This leaves the entire interior of molded inner cap 35 open as illustrated in FIG. 25. The final step in the molding method is to lower the unitary outer ring 102. As should be clear from the FIG. 25 illustration, the inclined surface 49e of each tab 49 protrudes radially outward and is pushed inwardly as the outer ring is removed (see FIG. 26). The various molding and ejection steps which have been described may be performed in sequences other than the one sequence depicted by FIGS. 18 and 24–26. For example, section 103a could be removed first, followed by the inner core 101 and then the outer ring 102 before finally removing section 103b.

In order to fabricate the individual frangible elements 51, the inner core 101 and outer ring 102 are placed in contact adjacent the uppermost edge of the outer ring. Individual projections of the outer ring extend radially inward into abutment with the outer surface of inner core 101. The spaces between adjacent projections create corresponding mold cavity portions which in turn result in the molding of the frangible elements. The polyethylene material used for the inner cap has a natural tendency to shrink after molding. As a consequence of this tendency, the frangible elements and their surrounding portions of the inner cap which include the undercuts in the mold between frangible elements will pull away from the inner core and outer ring. There is sufficient shrinkage to enable the use of a unitary outer ring 102 and thereby preclude the need for split block tooling which is more expensive and has higher maintenance requirements.

Figure 26:
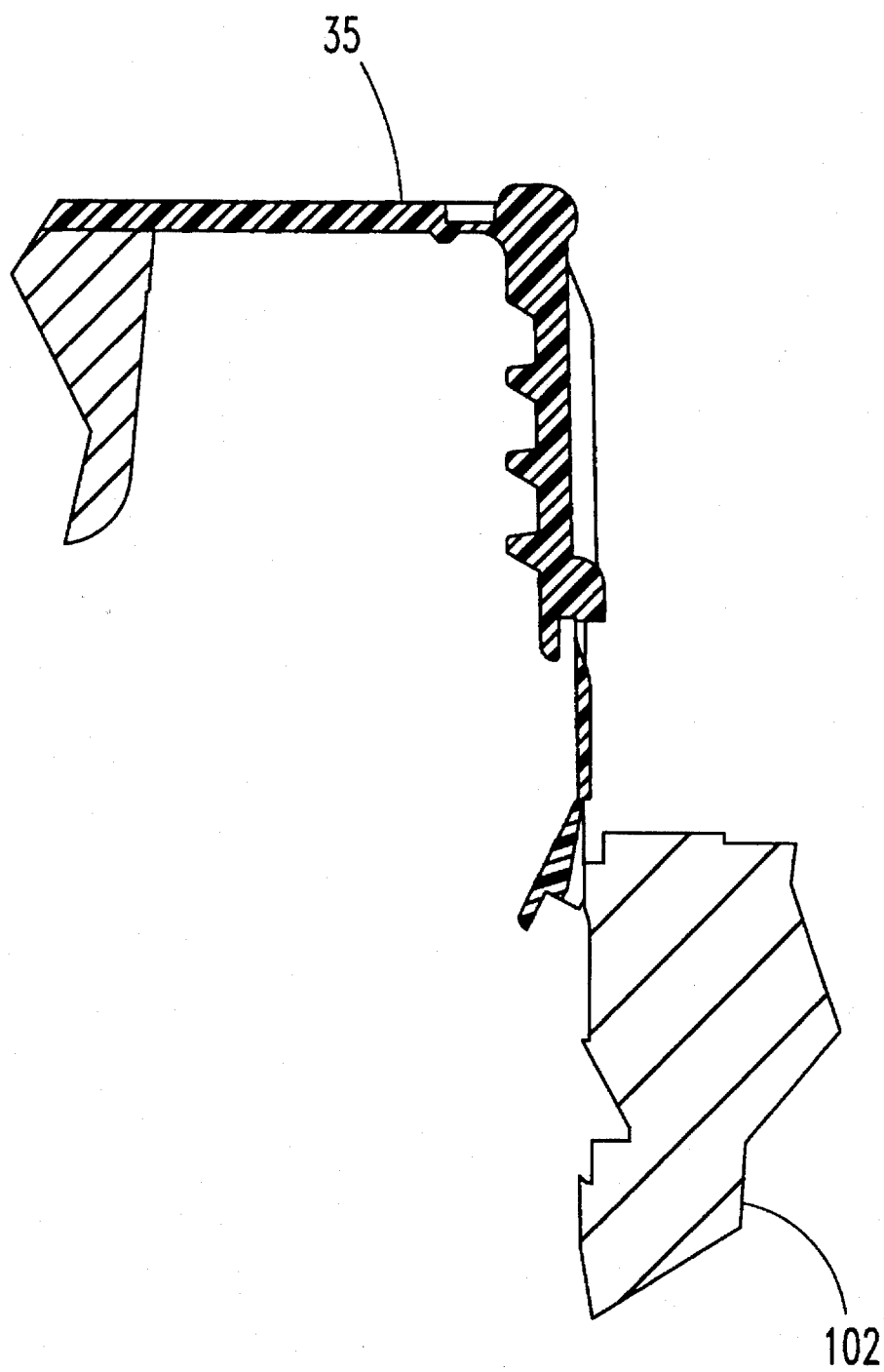
FIG. 26 is a front elevational view in full section of the FIG. 18 mold arrangement with the outer ring being removed.

As previously described, the plurality of tabs 49 are separated and connected by thin membrane sections 61. Each tab 49 is connected to the lower edge of ring 50 such that the junction of ring 50 and section 49a provides a hinge location for the initial inward bending of each tab as the outer ring 102 is separated from the molded part. The inward bending of each tab 49 as the outer ring is removed is illustrated in FIG. 26.

Due to the fact that ring 50 is circumferential and continuous in nature, it resists any radially inward bending or deflection as a result of removing the outer ring. Consequently, the hinging location is between ring 50 and tabs 49. This particular relationship between the various portions of the molded lower part of the inner cap 35 continues as the tabs 49 are folded upwardly and locked in the folded orientation behind annular bead 55.

There are two options for the procedure to fold the tabs behind the annular bead 55. With the inner cap oriented as illustrated in FIG. 26, though with the outer ring 102 completely removed, the tabs are bent inwardly. Consequently, when the inner core 101 is axially raised and reinserted into the molded inner cap 35, the outer edge of the inner core abuts up against the surfaces of the individual tabs 49. Continued upward advancement of the inner core bends the tabs upwardly and folds each tab behind the annular bead 55 where the tabs 49 are locked in position as illustrated in FIGS. 8 and 10.

Figure 27:
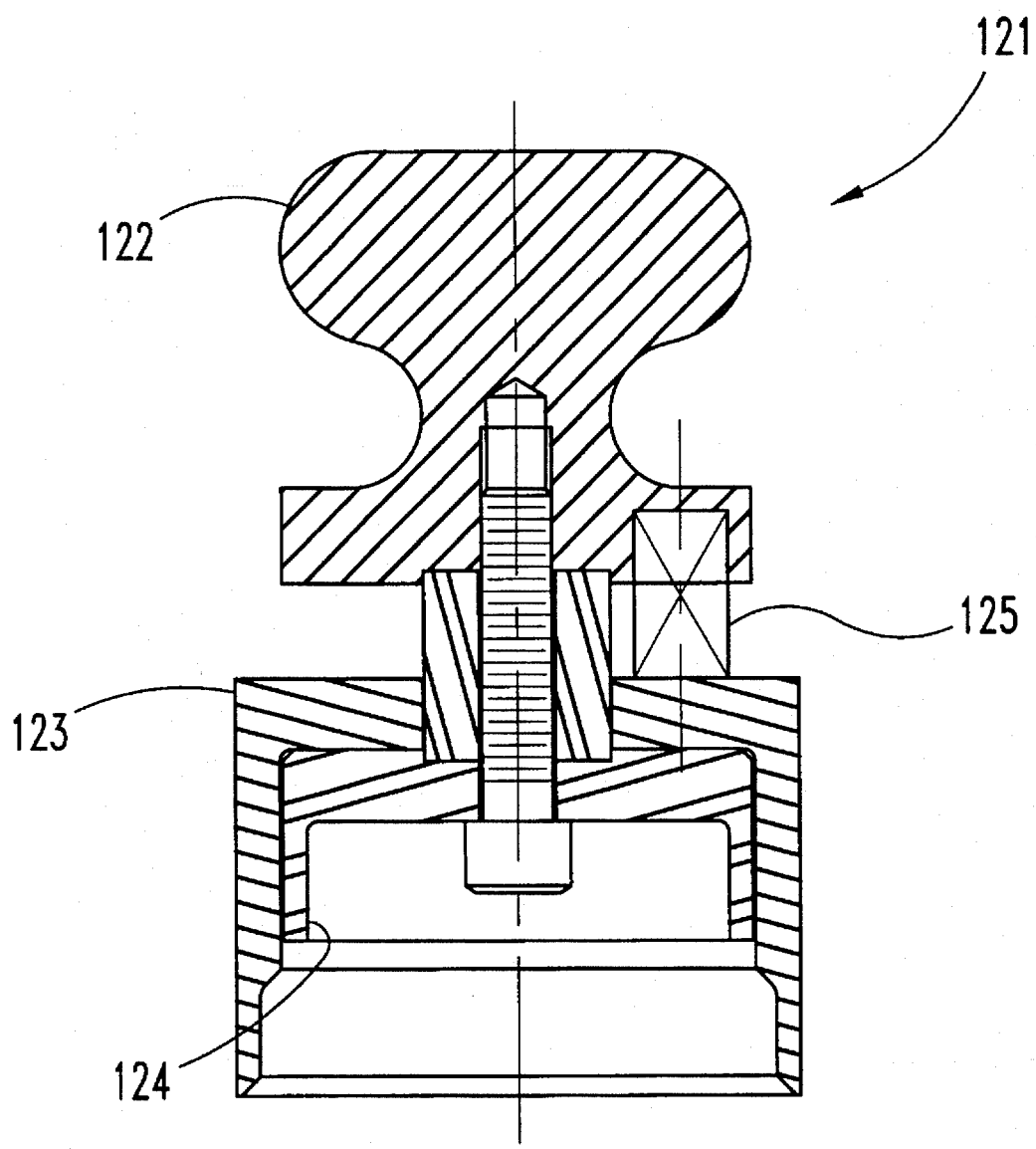
FIG. 27 is a front elevational view in full section of a tab folding apparatus which can be used in combination with the inner cap of the present invention to fold the tabs into a locked position.

Another option for bending the tabs 49 upwardly into a locked position behind annular bead 55 is to do so manually by means of the FIG. 27 tab folding apparatus 121. Apparatus 121 includes a handle 122, stationary outer sleeve 123, moveable inner plunger 124 and biasing spring 125. In order to use apparatus 121, the molded cap of FIG. 26 is inverted and the outer sleeve 123 is placed over the cap. As the handle is pushed downwardly, the inner plunger lowers, pushing against the surfaces of the folded tabs 49. This method step results in the tabs being folded into a locked position behind annular bead 55. When the handle is released so as to ready apparatus 121 for the next cap, the biasing spring returns the handle and the moveable inner plunger to their initial position as illustrated in FIG. 27.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A tamper-evident closure for sealing an open-topped container having an external screw thread formed on a neck finish of the container and an annular lip below said screw thread, said tamper-evident closure comprising:

a closure cap having an upper wall and an internally-threaded, surrounding sidewall, said sidewall extending downwardly from said upper wall to a lower edge portion, said closure cap further including in unitary construction with said sidewall and said lower edge portion, an annular bead downwardly extending beyond said lower edge portion; and tamper-indicating means comprising a break-away annular ring depending from said lower edge portion of the sidewall, a plurality of frangible elements detachably securing said annular ring to said lower edge portion, and a plurality of tabs bent upwardly, said frangible elements being radially spaced outwardly from said annular bead and defining therewith an annular channel, a portion of said tabs being positioned within said annular channel, whereby said annular bead is used to hold said tabs in their folded position, and whereby tab abutment against said annular lip during removal of said closure cap causes said frangible elements to break, separating said annular ring from the remainder of said closure cap.

2. The tamper-evident closure of claim 1 wherein said neck finish defines a circumferentially-extending series of axial ribs and each tab of said plurality of tabs having a ratchet-like shape and said plurality of tabs being designed and constructed for anti-backoff engagement with the series of axial ribs of said neck finish.

3. The tamper-evident closure of claim 1 which further includes an outer cap having an annular ring top wall portion which defines an open center portion and further having a surrounding sidewall.

4. The tamper-evident closure of claim 3 wherein said outer cap is arranged in overlying relation to said closure cap and is substantially concentric therewith.

5. The tamper-evident closure of claim 4 wherein said outer cap includes an annular ring pattern of ratchet teeth in unitary construction with said annular ring top wall portion and being oriented toward the upper wall of said closure cap, said upper wall having formed therein an annular ring pattern of receiving depressions and said ratchet teeth engaging said receiving depressions when the outer cap is turned in a clockwise advancing direction so as to rotate the closure cap and outer cap together and thereby cause the advancing threaded engagement of the closure cap onto the neck finish.

6. The tamper-evident closure of claim 5 wherein said outer cap includes at least one series of axial ribs in unitary construction with the sidewall of said outer cap and being oriented towards the sidewall of said closure cap and said closure cap including a plurality of axial ribs in unitary construction with the sidewall of said closure cap and oriented toward the sidewall of said outer cap, whereby ovalizing of said outer cap by oppositely and inwardly directed compressing forces brings a plurality of said axial ribs of said outer cap into the proximity of the axial ribs of said closure cap whereby turning of the outer cap in a counterclockwise removal direction results in axial rib engagement to enable the closure cap to be threadedly removed from the neck finish.

7. The tamper-evident closure of claim 6 wherein said neck finish defines a circumferentially-extending series of axial ribs and each tab of said plurality of tabs having a ratchet-like shape and said plurality of tabs being designed and constructed for anti-backoff engagement with the series of axial ribs of said neck finish.

8. A child-resistant closure for sealing an open-topped container having an external screw thread formed on a neck finish the container, said child-resistant closure comprising:

an outer cap having an annular ring top wall portion which defines an open center portion and further having a surrounding sidewall;

an inner cap having an upper wall and an internally-threaded, surrounding sidewall for engagement with the external screw thread on the neck finish of the container, the outer cap overlying the inner cap and being substantially concentric therewith;

an annular ring pattern of ratchet teeth in unitary construction with said annular ring top wall portion and oriented toward the upper wall of said inner cap, said upper wall having formed therein an annular ring pattern of receiving depressions and said ratchet teeth engaging said receiving depressions when the outer cap is turned in a clockwise advancing direction so as to rotate the inner and outer caps together and thereby cause the advancing threaded engagement of the inner cap onto the neck finish, the ratchet teeth sliding over the receiving depressions when the outer cap is turned in a counterclockwise removal direction, at least one series of axial ribs in unitary construction with the sidewall of said outer cap and oriented towards the sidewall of said inner cap;

a plurality of axial ribs in unitary construction with the sidewall of said inner cap and oriented toward the sidewall of said outer cap, whereby ovalizing of said outer cap by oppositely and inwardly directed compressive forces brings a plurality of said axial ribs of said outer cap into the proximity of the axial ribs of said inner cap whereby turning of the outer cap in a counterclockwise removal direction results in axial rib engagement to enable the inner cap to be threadedly removed from the neck finish; and tamper-indicating means comprising a break-away annular ring depending from a lower edge portion of the sidewall of said inner cap, said tamper-indicating means further including a plurality of frangible elements detachably securing said annular ring to said lower edge portion, said tamper-indicating means further including a plurality of tabs bent upwardly, said frangible elements being radially spaced outwardly from said annular bead and defining therewith an annular channel, a portion of said tabs being positioned within said annular channel, whereby said annular bead is used to hold said tabs in their folded position, and whereby tab abutment against said annular lip during removal of said inner cap causes said frangible elements to break, separating said annular ring from the remainder of said inner cap.

9. The child-resistant closure of claim 8 wherein said neck finish defines a circumferentially-extending series of axial ribs and each tab of said plurality of tabs having a ratchet-like shape and said plurality of tabs being designed and constructed for anti-backoff engagement with said series of axial ribs.

10. A hamper-evident closure for sealing an open-topped container having an external screw thread formed on a neck finish of the container, said tamper-evident closure comprising:

- a closure cap having an upper wall and an internally-threaded, surrounding sidewall, said sidewall extending downwardly from said upper wall to a lower edge portion, said closure cap further including, an annular bead downwardly extending beyond said lower edge portion; and
- tamper-indicating means comprising a break-away annular ring depending from said lower edge portion of the sidewall, a plurality of frangible elements detachably securing said annular ring to said lower edge portion, and a plurality of tabs bent upwardly, said frangible elements being radially spaced outwardly from said annular bead and defining therewith an annular channel, a portion of said tabs being positioned within said annular channel, whereby said annular bead is used to hold said tabs in their folded position, and whereby said tabs cooperate with said neck finish during removal of said closure cap, causing said frangible elements to break, thereby separating said annular ring from the remainder of said closure cap.

11. The tamper-evident closure of claim 10 which further includes an outer cap having an annular ring top wall portion which defines an open center portion and further having a surrounding sidewall.

12. The tamper-evident closure of claim 10 wherein said neck finish defines a circumferentially-extending series of axial ribs and each tab of said plurality of tabs having a ratchet-like shape and said plurality of tabs being designed and constructed for anti-backoff engagement with the series of axial ribs of said neck finish.

\* \* \* \* \*

UNITED STATES PATENT AND TRADEMARK OFFICE
CERTIFICATE OF CORRECTION

PATENT NO. : 5,609,262
DATED : March 11, 1997
INVENTOR(S) : Stanley D. Trout It is certified that error appears in the above-identified patent and that said Letters Patent is hereby corrected as shown below:

```
In Col. 4, line 40, replace "hike" with --the--.
In Col. 14, line 25, after "finish", insert --of--.
In Col. 15, line 15, replace "hamper" with --tamper--.
```

Signed and Sealed this

Fifteenth Day of July, 1997

Attest:

BRUCE LEHMAN

Attesting Officer  Commissioner of Patents and Trademarks